(12) United States Patent
Zhang et al.

(10) Patent No.: US 8,589,867 B2
(45) Date of Patent: Nov. 19, 2013

(54) COMPILER-GENERATED INVOCATION STUBS FOR DATA PARALLEL PROGRAMMING MODEL

(75) Inventors: Lingli Zhang, Sammamish, WA (US); Weirong Zhu, Issaquah, WA (US); Yosseff Levanoni, Redmond, WA (US); Paul F. Ringseth, Bellevue, WA (US); Charles David Callahan, II, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 669 days.

(21) Appl. No.: 12/819,108

(22) Filed: Jun. 18, 2010

(65) Prior Publication Data

US 2011/0314444 A1    Dec. 22, 2011

(51) Int. Cl.
G06F 9/44    (2006.01)

(52) U.S. Cl.
USPC ............ 717/106; 717/108; 717/119; 717/157

(58) Field of Classification Search
USPC .......................................... 717/119, 108, 157
See application file for complete search history.

(56) References Cited

U.S. PATENT DOCUMENTS

| | | |
|---|---|---|
| 4,205,371 A | 5/1980 | Feather |
| 4,340,857 A | 7/1982 | Fasang |
| 4,503,492 A | 3/1985 | Pilat |
| 4,516,203 A | 5/1985 | Farber et al. |
| 4,530,051 A | 7/1985 | Johnson et al. |
| 4,569,031 A | 2/1986 | Backes |
| 4,652,995 A | 3/1987 | Pilat |
| 4,811,214 A | 3/1989 | Nosenchuck et al. |
| 4,847,613 A | 7/1989 | Sakurai et al. |
| 4,847,755 A | 7/1989 | Morrison et al. |
| 4,853,929 A | 8/1989 | Azuma et al. |
| 4,868,776 A | 9/1989 | Gray et al. |
| 4,888,714 A | 12/1989 | Dingle |
| 5,222,214 A | 6/1993 | Kobayashi |
| 5,261,095 A | 11/1993 | Crawford et al. |
| 5,278,986 A | 1/1994 | Jourdenais et al. |
| 5,317,689 A | 5/1994 | Nack et al. |
| 5,339,430 A | 8/1994 | Lundin et al. |
| 5,355,492 A | 10/1994 | Frankel et al. |
| 5,355,494 A | 10/1994 | Sistare et al. |
| 5,361,363 A | 11/1994 | Wells et al. |
| 5,361,366 A | 11/1994 | Kawano et al. |
| 5,375,125 A | 12/1994 | Oshima et al. |
| 5,377,191 A | 12/1994 | Farrell et al. |
| 5,377,228 A | 12/1994 | Ohara et al. |
| 5,381,550 A | 1/1995 | Jourdenais et al. |

(Continued)

OTHER PUBLICATIONS

Gautier et al., "Re-scheduling invocation of services for RPC grids", Jul. 26, 2006.*

(Continued)

*Primary Examiner* — Phillip H Nguyen
(74) *Attorney, Agent, or Firm* — Lee & Hayes, PLLC

(57) ABSTRACT

Described herein are techniques for generating invocation stubs for a data parallel programming model so that a data parallel program written in a statically-compiled high-level programming language may be more declarative, reusable, and portable than traditional approaches. With some of the described techniques, invocation stubs are generated by a compiler and those stubs bridge a logical arrangement of data parallel computations to the actual physical arrangement of a target data parallel hardware for that data parallel computation.

20 Claims, 5 Drawing Sheets

(56) References Cited

U.S. PATENT DOCUMENTS

| | | | |
|---|---|---|---|
| 5,404,519 A | 4/1995 | Denio | |
| 5,426,694 A | 6/1995 | Hebert | |
| 5,475,842 A | 12/1995 | Gilbert et al. | |
| 5,524,192 A | 6/1996 | Dauerer et al. | |
| 5,539,909 A | 7/1996 | Tanaka et al. | |
| 5,544,091 A | 8/1996 | Watanabe | |
| 5,561,801 A | 10/1996 | Simons et al. | |
| 5,566,302 A | 10/1996 | Khalidi et al. | |
| 5,566,341 A | 10/1996 | Roberson et al. | |
| 5,613,139 A | 3/1997 | Brady | |
| 5,625,793 A | 4/1997 | Mirza | |
| 5,659,778 A | 8/1997 | Gingold et al. | |
| 5,671,419 A | 9/1997 | Carini et al. | |
| 5,680,597 A | 10/1997 | Kumar et al. | |
| 5,696,991 A | 12/1997 | Chang | |
| 5,712,996 A | 1/1998 | Schepers | |
| 5,729,748 A | 3/1998 | Robbins et al. | |
| 5,737,607 A | 4/1998 | Hamilton et al. | |
| 5,765,037 A | 6/1998 | Morrison et al. | |
| 5,841,976 A | 11/1998 | Tai et al. | |
| 5,845,085 A | 12/1998 | Gulick | |
| 5,872,987 A | 2/1999 | Wade et al. | |
| 5,887,172 A | 3/1999 | Vasudevan et al. | |
| 5,896,517 A | 4/1999 | Wilson | |
| 6,032,199 A | 2/2000 | Lim et al. | |
| 6,106,575 A | 8/2000 | Hardwick | |
| 6,163,539 A | 12/2000 | Alexander et al. | |
| 6,219,775 B1 | 4/2001 | Wade et al. | |
| 6,438,745 B1 | 8/2002 | Kanamaru et al. | |
| 7,493,606 B2 | 2/2009 | Morin | |
| 7,512,738 B2 | 3/2009 | Balakrishnan et al. | |
| 7,802,268 B2 | 9/2010 | Webb et al. | |
| 8,261,234 B1* | 9/2012 | Aarts et al. | 717/106 |
| 2004/0083462 A1* | 4/2004 | Gschwind et al. | 717/140 |
| 2006/0031814 A1 | 2/2006 | Morin | |
| 2007/0233766 A1 | 10/2007 | Gschwind | |
| 2008/0034356 A1 | 2/2008 | Gschwind | |
| 2008/0034357 A1 | 2/2008 | Gschwind | |
| 2008/0052730 A1 | 2/2008 | Webb et al. | |
| 2008/0229066 A1 | 9/2008 | Gschwind | |
| 2009/0089658 A1* | 4/2009 | Chiu et al. | 715/234 |
| 2009/0307655 A1 | 12/2009 | Pingali et al. | |
| 2011/0161623 A1 | 6/2011 | Eichenberger et al. | |
| 2011/0314256 A1 | 12/2011 | Callahan, II et al. | |
| 2012/0180031 A1 | 7/2012 | Eichenberger et al. | |

OTHER PUBLICATIONS

Kostadin Damevski, "Parallel component interaction with an interface Definition language compiler", May 2003.*
Greg Stephen Eisenhauer, "An Object Infrastructure for High-Performance Interactive Applications", 1998.*
Damevski et al., "Parallel Remote Method Invocation and M-by-N Data Redistribution", 2003.*
Office action for U.S. Appl. No. 12/819,097, mailed on Sep. 13, 2012 Callahan II et al., "Data Parallel Programming Model", 19 pages.
Blelloch et al., Abstract: "CVL: A C Vectory Library", CMU-CS-93-114, Feb. 1993, 1 page, found at http://www.cs.cmu.edu/afs/cs.cmu.edu/project/scandal/public/papers/CMU-CS-93-114.html.
Blelloch et al., Abstract: "Implementation of a Portable Nested Data-Parallel Language", Journal of Parallel and Distributed Computing, vol. 21, No. 1, Apr. 1994, 1 page, found at http://www.cs.cmu.edu/afs/cs.cmu.edu/project/scandal/public/papers/nesl-ppopp93.html.
Blelloch, "Programming Parallel Algorithms", On-line version of article in Communication of the ACM, vol. 39, No. 3, Mar. 1996, 2 pages. found at http://www.cs.cmu.edu/~scandal/cacm.html.
Blelloch, "Scans as Primitive Parallel Operations", Carnegie Mellon University, School of Computer Science, Nov. 1989, 45 pages.
Blelloch, Abstract: "NESL: A Nested Data-Parallel Language", CMU-CS-93-129, Apr. 1993, 1 page, found at http://www.cs.cmu.edu/afs/cs.cmu.edu/project/scandal/public/papers/CMU-CS-93-129.html.
Brodman et al., "New Abstractions for Data Parallel Programming", 1st USENIX Workshop on Hot Topics in Parallelism (HotPar'09), Berkeley, California, Mar. 30-31, 2009, 11 pages, found at http://www.usenix.org/event/hotpar09/tech/full_papers/brodman/brodman_html/index.html.
Chavarria-Miranda et al., "An Evaluation of Data-Parallel Compiler Support for Line-Sweep Applications", Proceedings of 11th International Conference on Parallel Arcitectures and Compilation Techniques (PACT'02), Charottesville, Virginia, Sep. 22-25, 2002, pp. 7-17, found at <<>>http://moss.csc.ncsu.edu/-mueller/pact02/papers/chavarria193.pdf>.
Chavarria-Miranda et al., "An Evaluation of Data-Parallel Compiler Support for Line-Sweep Applications", Journal of Instruction-Level Parallelism, vol. 5, Apr. 2003, pp. 1-29, found at <<http://www.jilp.org/vol5/v5paper2.pdf>>.
Hardwick, Abstract: "Porting a Vector Library: a Comparison of MPI, Paris, CMMD and PVM", CMU-CS-94-200, Nov. 1994 (also Scalable Parallel Libraries Conference, Oct. 1994), 1 page, found at http://www.cs.cmu.edu/afs/cs/cmu.edu/project/scandal/public/papers/CMU-CS-94-200.html.
Klaiber, Alexander C., "Architectural Support for Compiler-Generated Data-Parallel Programs", Ph.D. Dissertation, University of Washington, Department of Computer Science and Engineering, 1994, 132 pages, found at <<http://academic.research.microsoft.com/Paper/206763.aspx>>.
Kotz, "A DAta-Parallel Programming Library for Education (DAPPLE)", to appear in Computer Science Education, vol. 6, No. 2, copyright 1996 by Ablex Publishing, 23 pages, earlier versions in SIGCSE 1995 and Dartmouth PCS-TR95-235, available at http://www.cs.dartmouth.edu/~dfk/papers/kotz:jdapple.pdf.
Locke, "Available C++ Libraries FAQ: Tools for C++ Programmers", 2010 (copywright Nikki Locke, Trumphurst Ltd), 2010, 2 pages, found at http://www.trumphurst.com/cpplibs/datapage.php?sqldata=Dataid=464.
McCool, "Data-Parallel Programming on the Cell BE and the GPU Using the RapidMind Development Platform", Presented at GSPx Multicore Applications Conference, Santa Clara, Oct. 31-Nov. 2, 2006, 9 pages, found at http://www.cs.ucla.edu/~palsberg/course/cs239/papers/mccool.pdf.
"Open-MP: C++ Examples of Parallel Programming with OpenMP", last revised Apr. 5, 2008, 4 pages, found at http://people.sc.fsu.edu/~burkardt/cpp_src/open_mp/open_mp.html.
"Parallel Programming in the .NET Framework", Copyright 2010 Microsoft Corporation, 2 pages, found at http://msdn.microsoft.com/en-us/library/dd460693.aspx.
Parrington, "A Stub Generation System for C++", University of Newcastle upon Tyne, Department of Computing Science, UK, 1994, appeared in Computing Systems, vol. 8, No. 2, 1995, pp. 135-169, retrieved from the internet at http://www.cs.ncl.ac.uk/research/pubs/articles/papers/94.pdf.
Sengupta et al., "Scan Primitives for GPU Computing", Graphics Hardware, 2007, San Diego, CA, Aug. 4-5, 2007, 11 pages, found at http://www.idav.ucdavis.edu/func/return_pdf?pub_id=915.
Sipelstein et al., Abstract: "Collection-Oriented Languages", Proceedings of the IEEE, Apr. 1991, CMU-CS-90-127, 1 page, found at http://www.cs.cmu.edu/afs/cs.cmu.edu/project/scandal/public/papers/CMU-CS-90-127.html.
"The OpenCL Specification", Khronos OpenCL Working Group, editor Aaftab Munshi, last revised Oct. 6, 2009, 308 pages, found at http://www.khronos.org/registry/cl/specs/opencl-1.0.48.pdf.
Wilson, et al., "Parallel Programming Using C++", The MIT Press, Jul. 1996, 1 page, found at http://mitpress.mit.edu/catalog/item/default.asp?ttype=2&tid=3952.
Office action for U.S. Appl. No. 12/819,097, mailed on Apr. 24, 2013, Callahan II et al., "Data Parallel Programming Model," 15 pages.

* cited by examiner

COMPILER-GENERATED INVOCATION STUBS FOR DATA PARALLEL PROGRAMMING MODEL

BACKGROUND

In data parallel computing, the parallelism comes from distributing large sets of data across multiple simultaneous separate parallel computing operators or nodes. In contrast, task parallel computing involves distributing the execution of multiple threads across multiple simultaneous separate parallel computing operators or nodes. Typically, hardware is designed specifically to perform data parallel operations. Therefore, a data parallel program is a program written specifically for data parallel hardware. Traditionally, data parallel programming requires highly sophisticated programmers who understand the non-intuitive nature of data parallel concepts and are intimately familiar with the specific data parallel hardware being programmed.

Outside the realm of supercomputing, a common use of data parallel programming is graphics processing, because such processing is regular, data intensive and specialized graphics hardware is available. Particularly, a Graphics Processing Unit (GPU) is a specialized many-core processor designed to offload complex graphics rendering from the main central processing unit (CPU) of a computer. A many-core processor is one in which the number of cores is large enough that traditional multi-processor techniques are no longer efficient—this threshold is somewhere in the range of several tens of cores. While many-core hardware is not necessarily the same as data parallel hardware, data parallel hardware can usually be considered to be many-core hardware.

Other existing data parallel hardware includes Single instruction, multiple data (SIMD), Streaming SIMD Extensions (SSE) units in x86/x64 processors available from contemporary major processor manufactures.

Typical computers have historically been based upon a traditional single-core general-purpose CPU that was not specifically designed or capable of data parallelism. Because of that, traditional software and applications for traditional CPUs do not use data parallel programming techniques. However, the traditional single-core general-purpose CPUs are being replaced by many-core general-purpose CPUs.

While a many-core CPU is capable of data parallel functionality, little has been done to take advantage of such functionality. Since traditional single-core CPUs are not data parallel capable, most programmers are not familiar with data parallel techniques. Even if a programmer was interested, there remains the great hurdle for the programmer to fully understand the data parallel concepts and to learn enough to be sufficiently familiar with the many-core hardware to implement those concepts.

If a programmer clears those hurdles, they must recreate such programming for each particular many-core hardware arrangement where they wish for their program to run. That is, because conventional data parallel programming is hardware specific, the particular solution that works for one data parallel hardware will not necessarily work for another. Since the programmer programs their data parallel solutions for the specific hardware, the programmer faces a compatibility issue with differing hardware.

Presently, no widely adopted, effective, and general-purpose solution exists that enables a typical programmer to perform data parallel programming. A typical programmer is one who does not fully understand the data parallel concepts and is not intimately familiar with each incompatible data-parallel hardware scenario. Furthermore, no effective present solution exists that allows a programmer (typical or otherwise) to be able to focus on the high-level logic of the application being programmed rather than focus on the specific implementation details of the target hardware level.

SUMMARY

Described herein are techniques for generating invocation stubs for a data parallel programming model so that a data parallel program written in a statically-compiled high-level programming language may be more declarative, reusable, and portable than traditional approaches. With some of the described techniques, invocation stubs are generated by a compiler, and those stubs bridge a logical arrangement of data parallel computations to the actual physical arrangement of a target data parallel hardware for that data parallel computation.

In some other described techniques, a compiler maps given input data expected by unit data parallel computations (i.e., "kernels") of data parallel functions.

This Summary is provided to introduce a selection of concepts in a simplified form that is further described below in the Detailed Description. This Summary is not intended to identify key features or essential features of the claimed subject matter. The term "techniques," for instance, may refer to device(s), system(s), method(s), and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
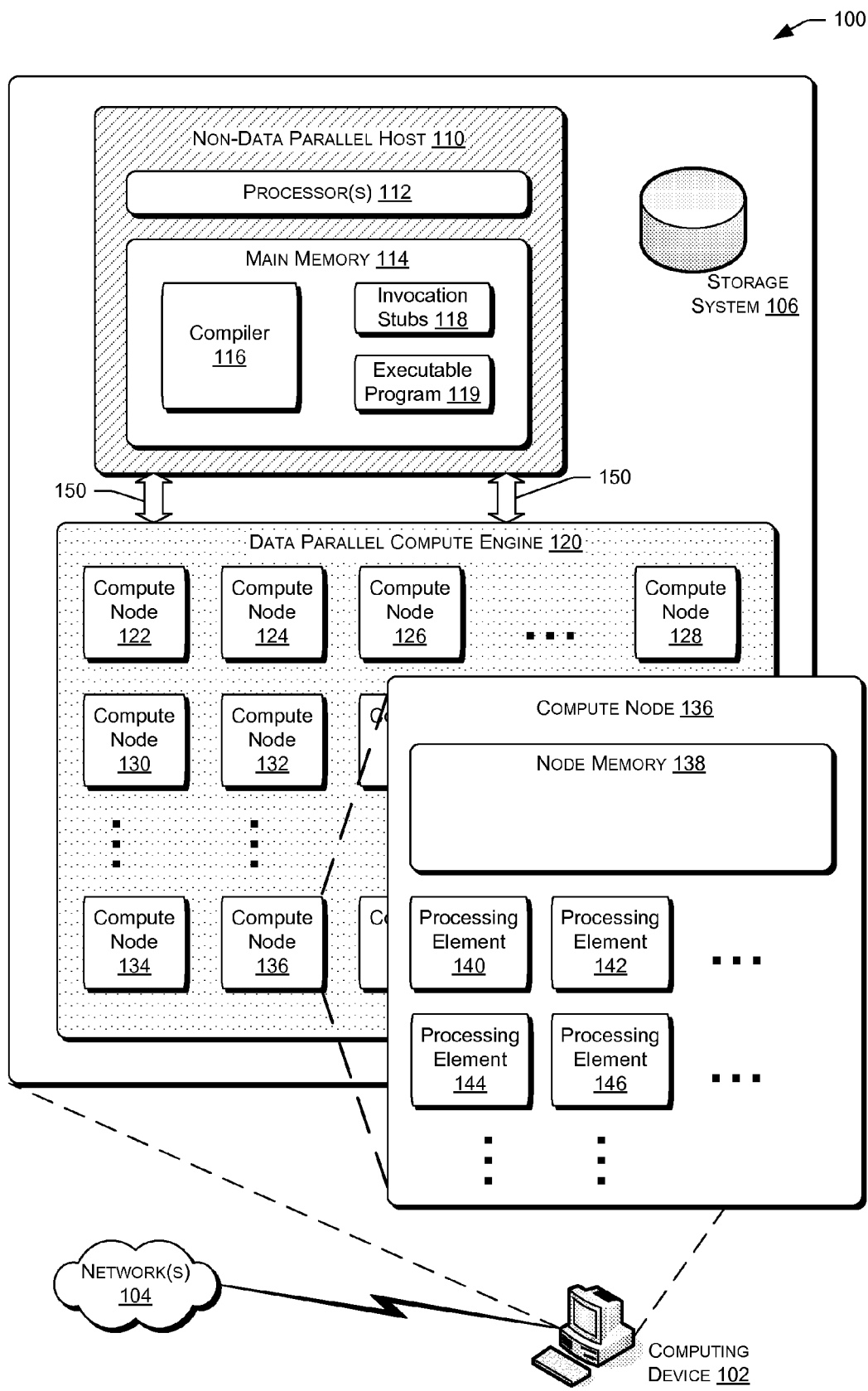
FIG. 1 illustrates an example computing environment is usable to implement techniques for the data parallel programming model described herein.

Described herein are techniques for generating invocation stubs for a data parallel programming model so that a data parallel program written in a statically-compiled high-level programming language may be more declarative, reusable, and portable than traditional approaches. With some of the described techniques, invocation stubs are generated by a compiler and those stubs bridge a logical arrangement of data parallel computations to the actual physical arrangement of a target data parallel hardware for that data parallel computation. In other words, the invocation stubs bridge the gap between the generalized and logical data parallel implementation (e.g., a data parallel program) to the specific and physical data parallel implementation (e.g., in data parallel hardware). In some described techniques, the compiler generates code that maps given input data to those expected by unit data parallel computations (i.e., "kernels") of data parallel functions.

To achieve a degree of hardware independence, the implementations are described as part of a general-purpose programming language that may be extended to support data parallel programming. The C++ programming language is the primary example of such a language as is described herein. C++ is a statically-typed, free-form, multi-paradigm, compiled, general-purpose programming language. C++ may also be described as imperative, procedural, object-oriented, and generic. The C++ language is regarded as a mid-level programming language, as it comprises a combination of both high-level and low-level language features. The inventive concepts are not limited to expressions in the C++ programming language. Rather, the C++ language is useful for describing the inventive concepts. Examples of some alternative programming language that may be utilized include Java™, C, PHP, Visual Basic, Perl, Python™, C#, Ruby, Delphi, Fortran, VB, F#, OCaml, Haskell, Erlang, and Java-Script™. That said, some of the claimed subject matter may cover specific programming expressions in C++ type language, nomenclature, and format.

Some of the described implementations offer a foundational programming model that puts the software developer in explicit control over many aspects of the interaction with data parallel resources. The developer allocates data parallel memory resources and launches a series of data parallel call-sites which access that memory. Data transfer between non-data parallel resources and the data parallel resources is explicit and typically asynchronous.

The described implementations offer deep integration with a compilable general-purpose programming language (e.g., C++) and with a level of abstraction which is geared towards expressing solutions in terms of problem-domain entities (e.g., multi-dimensional arrays), rather than hardware or platform domain entities (e.g., C-pointers that capture offsets into buffers).

The described embodiments may be implemented on data parallel hardware such as those using many-core processors or SSE units in x64 processors. Some described embodiments may be implemented on clusters of interconnected computers, each of which possibly has multiple GPUs and multiple SSE/AVX™ (Advanced Vector Extensions)/LRBni™ (Larrabee New Instruction) SIMD and other data parallel coprocessors.

A following co-owned U.S. patent application is incorporated herein by reference and made part of this application: U.S. Ser. No. 12/819,097, filed on Jun. 18, 2010 [it is titled: "Data Parallel Programming Model," filed on the same day at this application, and having common inventorship].

Example Computing Infrastructure

FIG. 1 illustrates an example computer architecture 100 that may implement the techniques described herein. The architecture 100 may include at least one computing device 102, which may be coupled together via a network 104 to form a distributed system with other devices. While not illustrated, a user (typically a software developer) may operate the computing device while writing a data parallel ("DP") program. Also not illustrated, the computing device 102 has input/output subsystems, such as a keyboard, mouse, monitor, speakers, etc. The network 104, meanwhile, represents any one or combination of multiple different types of networks interconnected with each other and functioning as a single large network (e.g., the Internet or an intranet). The network 104 may include wire-based networks (e.g., cable) and wireless networks (e.g., cellular, satellite, etc.).

The computing device 102 of this example computer architecture 100 includes a storage system 106, a non-data-parallel (non-DP) host 110, and at least one data parallel (DP) compute engine 120. In one or more embodiments, the non-DP host 110 runs a general-purpose, multi-threaded and non-DP workload, and performs traditional non-DP computations. In alternative embodiments, the non-DP host 110 may be capable of performing DP computations, but not the computations that are the focus of the DP programming model. The host 110 (whether DP or non-DP) controls the DP compute engine 120. The host 110 is the hardware on which the operating system (OS) runs. In particular, the host provides the environment of an OS process and OS thread when it is executing code.

The DP compute engine 120 performs DP computations and other DP functionality. The DP compute engine 120 is the hardware processor abstraction optimized for executing data parallel algorithms. The DP compute engine 120 may also be called the DP device. The DP compute engine 120 may have a distinct memory system from the host. In alternative embodiments, the DP compute engine 120 may share a memory system with the host.

The storage system 106 is a place for storing programs and data. The storage system 106 includes a computer-readable media, such as, but not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive).

The non-DP host 110 represents the non-DP computing resources. Those resources include, for example, one or more processors 112 and a main memory 114. Residing in the main memory 114 are a compiler 116 and one or more executable programs, such as program 118. The compiler 116 may be, for example, a compiler for a general-purpose programming language that includes the implementations described herein. More particularly, the compiler 116 may be a C++ language compiler. The invocation stubs 118 may be intermediate results from the compiler 116. The invocation stubs 118 may be, for example, generated in HLSL (High Level Shading Language) code, C++, or another intermediate representation, such as a Common Intermediate Language (CIL). Depending upon whether the compilation model is static or dynamic, the invocation stubs 118 may reside in the memory while the program executes. For static compilation model, these stubs may be combined with kernel functions and turned to device-executable, in which case, the intermediate form of these stubs might not reside in memory after compilation is done. In a dynamic compilation model, compilation itself is part of the program execution; therefore, the intermediate stubs may reside in memory while program is executing. The dynamic compiler may combine it with corresponding kernel functions to produce device-executable instructions at runtime. An invocation stub is an entry point of device-executable program (called a Shader on Microsoft's DirectX® platform of application programming interfaces). The stubs may be generated for each parallel invocation site. The stubs calculate logic indices of each parallel activity based on the physical thread indices and the logical compute domain (i.e., it bridges the logical and physical arrangement). The stubs then map arguments provided at parallel invocation sites (e.g., a forall call-site) to parameters that are expected by the invoked kernel function via either projection or broadcasting, and finally invokes the kernel function. The stubs include a customization of the kernel function for the given parallel invocation with different input data and logical compute domains.

On the other hand, the program 119 may be, at least in part, an executable program resulting from a compilation by the compiler 116. The compiler 116, the invocation stubs 118, and the program 119 are modules of computer-executable instructions, which are instructions executable on a computer, computing device, or the processors of a computer. While shown here as modules, the component may be embodied as hardware, software, or any combination thereof Also, while shown here residing on the computing device 102, the component may be distributed across many computing devices in the distributed system.

Alternatively, one may view the invocation stubs 118 as being part of the executable program 119.

The DP compute engine 120 represents the DP-capable computing resources. On a physical level, the DP-capable computing resources include hardware (such as a GPU or SIMD and its memory) that is capable of performing DP tasks. On a logical level, the DP-capable computing resources include the DP computation being mapped to, for example, multiple compute nodes (e.g., 122-136), which perform the DP computations. Typically, each compute node is identical in the capabilities to each other, but each node is separately managed. Like a graph, each node has its own input and its own expected output. The flow of a node's input and output is to/from the non-DP host 110 or to/from other nodes.

The compute nodes (e.g., 122-136) are logical arrangements of DP hardware computing resources. Logically, each compute node (e.g., node 136) is arranged to have its own local memory (e.g., node memory 138) and multiple processing elements (e.g., elements 140-146). The node memory 138 may be used to store values that are part of the node's DP computation and which may persist past one computation.

Typically, the node memory 138 is separate from the main memory 114 of the non-DP host 110. The data manipulated by DP computations of the compute engine 120 is semantically separated from the main memory 114 of the non-DP host 110. As indicated by arrows 150, values are explicitly copied from general-purpose (i.e., non-DP) data structures in the main memory 114 to and from the aggregate of data associated with the DP compute engine 120 (which may be stored as a collection of local memory, like node memory 138). The detailed mapping of data values to memory locations may be under the control of the system (as directed by the compiler 116), which will allow concurrency to be exploited when there are adequate memory resources.

Each of the processing elements (e.g., 140-146) represents the performance of a DP kernel function (or simply "kernel"). A kernel is a fundamental data-parallel task to be performed.

The kernels operate on an input data set defined as a field. A field is a multi-dimensional aggregate of data of a defined element type. The elemental type may be, for example, an integer, a floating point number, Boolean, or any other classification of values usable on the computing device 102.

In this example computer architecture 100, the non-DP host 110 may be part of a traditional single-core central processor unit (CPU) with its memory, and the DP compute engine 120 may be one or more graphical processing units (GPU) on a discrete Peripheral Component Interconnect (PIC) card or on the same board as the CPU. The GPU may have a local memory space that is separate from that of the CPU. Accordingly, the DP compute engine 120 has its own local memory (as represented by the node memory (e.g., 138) of each computer node) that is separate from the non-DP host's own memory (e.g., 114). With the described implementations, the programmer has access to these separate memories.

Alternatively to the example computer architecture 100, the non-DP host 110 may be one of many CPUs or GPUs, and the DP compute engine 120 may be one or more of the rest of the CPUs or GPUs, where the CPUs and/or GPUs are on the same computing device or operating in a cluster. Alternatively still, the cores of a multi-core CPU may make up the non-DP host 110 and one or more DP compute engines (e.g., DP compute engine 120).

With the described implementations, the programmer has the ability to use the familiar syntax and notions of a function call of mainstream and traditionally non-DP programming languages (such as C++) to the create DP functionality with DP capable hardware. This means that a typical programmer may write one program that directs the operation of the traditional non-DP capable hardware (e.g., the non-DP host 110) for any DP capable hardware (e.g., the compute engine 120). At least in part, the executable program 118 represents the program written by the typical programmer and compiled by the compiler 116.

The code that the programmer writes for the DP functionality is similar in syntax, nomenclature, and approach to the code written for the traditional non-DP functionality. More particularly, the programmer may use familiar concepts of passing array arguments for a function to describe the specification of elemental functions for DP computations.

A compiler (e.g., the compiler 116), produced in accordance with the described implementations, handles many details for implementing the DP functionality on the DP capable hardware. In other words, the compiler 116 generates code that maps the logical arrangement of the DP compute engine 120 onto the physical DP hardware (e.g., DP-capable processors and memory). Because of this, a programmer need not consider all of the features of the DP computation to capture the semantics of the DP computation. Of course, if a programmer is familiar with the hardware on which the program may run, that programmer still has the ability to specify or declare how particular operations may be performed and how other resources are handled.

In addition, the programmer may use familiar notions of data set sizes to reason about resources and costs. Beyond cognitive familiarity, for software developers, this new approach allows common specification of types and operation semantics between the non-DP host 110 and the DP compute engine 120. This new approach streamlines product development and makes DP programming and functionality more approachable.

With this new approach, these programming concepts are introduced:

Fields: a multi-dimensional aggregate of data of a predefined dimension and element data type.

Index: a multi-dimensional vector used to index into an aggregate of data (e.g., field).

Grid: an aggregate of index instances. Specifically, a grid specifies a multidimensional rectangle that represents all instances of index that are inside the rectangle.

Compute Domain (e.g., grid): an aggregate of index instances that describes all possible parallel activities that a data parallel computation can be petitioned.

DP call-site function: the syntax and semantics defined for four DP call-site functions; namely, forall, reduce, scan, and sort.

Fields

When programming for traditional non-DP hardware, software developers often define custom data structures, such as lists and dictionaries, which contain an application's data. In order to maximize the benefits that are possible from data parallel hardware and functionalities, new data containers offer the DP programs a way to house and refer to the program's aggregate of data. The DP computation operates on these new data containers, which are called "fields."

A field is the general data array type that DP code manipulates and transforms. It may be viewed as a multi-dimensional array of elements of specified data type (e.g., integer and floating point). For example, a one-dimensional field of floats may be used to represent a dense float vector. A two-dimensional field of colors can be used to represent an image.

More, specifically, let float4 be a vector of 4 32-bit floating point numbers representing Red, Green, Blue and Anti-aliasing values for a pixel on a computer monitor. Assuming the monitor has resolution 1200×1600, then:

field<2, float4> screen(grid<2>(1200, 1600));

is a good model for the screen.

A field need not be a rectangular grid of definition. Though it is typically defined over an index space that is affine in the sense it is a polygon and polyhedral or a polytope—viz., it is formed as the intersection of a finite number of spaces of the form:

f(x1, x2, xn)>=c where x1, x2, xn are the coordinates in N-dimensional space and 'f' is a linear function of the coordinates.

Fields are allocated on a specific hardware device. Their element type and number of dimension are defined at compile time, while their extents are defined at runtime. In some implementations, a field's specified data type may be a uniform type for the entire field. A field may be represented in this manner: field<N,T>, where N is the number of dimensions of the aggregate of data and T is the elemental data type. Concretely, a field may be described by this generic family of classes:

---
Pseudocode 1
---
```
template<int N, typename element_type>
class field {
public:
        field(domain_type & domain);
        element_type & operator[ ](const index<N>&);
        const element_type& operator[ ](const index<N>&) const;
......
    };
```
---

Fields are allocated on a specific hardware device basis (e.g., computing device 102). A field's element type and number of dimensions are defined at compile time, while their extents are defined at runtime. Typically, fields serve as the inputs and/or outputs of a data parallel computation. Also, typically, each parallel activity in such a computation is responsible for computing a single element in an output field.

Index

The number of dimensions in a field is also called the field's rank. For example, an image has a rank of two. Each dimension in a field has a lower bound and an extent. These attributes define the range of numbers that are permissible as indices at the given dimension. Typically, as is the case with C/C++ arrays, the lower bound defaults to zero. In order to get or set a particular element in a field, an index is used. An index is an N-tuple, where each of its components fall within the bounds established by corresponding lower bound and extent values. An index may be represented like this: Index<N>, where the index is a vector of size N, which can be used to index a rank N field. A valid index may be defined in this manner:

---
Pseudocode 2
---
valid index = { $<i_0, ..., i_{N-1}>$ | where $i_k >=$ lower_bound$_k$ and $i_k <$ lower_bound$_k$ + extent$_k$ }
---

Compute Domain

The compute domain is an aggregate of index instances that describes all possible parallel threads that a data parallel device must instantiate while executing a kernel. The geometry of the compute domain is strongly correlated to the data (viz., fields) being processed, since each data parallel thread makes assumptions about what portion of the field it is responsible for processing. Very often, a DP kernel will have a single output field and the underlying grid of that field will be used as a compute domain. But it could also be a fraction (like 1/16) of the grid, when each thread is responsible for computing 16 output values.

Abstractly, a compute domain is an object that describes a collection of index values. Since the compute domain describes the shape of aggregate of data (i.e., field), it also describes an implied loop structure for iteration over the aggregate of data. A field is a collection of variables where each variable is in one-to-one correspondence with the index values in some domain. A field is defined over a domain and logically has a scalar variable for every index value. Herein, a compute domain may be simply called a "domain." Since the compute domain specifies the length or extent of every dimension of a field, it may also be called a "grid."

In a typical scenario, the collection of index values simply corresponds to multi-dimensional array indices. By factoring the specification of the index value as a separate concept (called the compute domain), the specification may be used across multiple fields and additional information may be attached.

A grid may be represented like this: Grid<N>. A grid describes the shape of a field or of a loop nest. For example, a doubly-nested loop, which runs from 0 to N on the outer loop and then from 0 to M on the inner loop, can be described with a two-dimensional grid, with the extent of the first dimension spanning from 0 (inclusive) to N (non-inclusive) and the second dimension extending between 0 and M. A grid is used to specify the extents of fields, too. Grids do not hold data. They only describe the shape of it.

An example of a basic domain is the cross-product of integer arithmetic sequences. An arithmetic sequence is stored in this class:

---
Pseudocode 3
---
```
struct arithmetic_sequence {
    int lb, extent, stride;
    ArithmeticSequence(int n) ;
    ArithmeticSequence(int nl, int nu) ;
    ArithmeticSequence(int nl, int nu, int s);
};
```
---

This represents the set of values {lb+i*stride|0≤i<extent}. A cross-product of these sets is called a grid, where the number of sets is called the rank of the grid. Grids may be represented by a family of types distinguished by their ranks.

Pseudocode 4

```
template<unsigned rank>
class grid : domain<rank> {
        arithmetic_sequence values[rank];
    public:
        ...
        size_t extent( ); // product of component extents
        arithmetic_sequence dimension(int i) { return values[i]; }
};
```

With this, varieties of constructors have been elided and are specialization specific. The rank or dimensionality of the domain is a part of the type so that it is available at compile time.

Resource View

A resource_view is represents a data parallel processing engine on a given compute device. A compute_device is an abstraction of a physical data parallel device. There can be multiple resource_view on a single compute_device. In fact, a resource_view may be viewed as a data parallel thread of execution.

If a resource_view is not explicitly specified, then a default one may be created. After a default is created, all future operating system (OS) threads on which a resource view is implicitly needed, will get the default previously created. A resource_view can be used from different OS threads.

Also with this new approach, a resource view allows concepts, such as priority, deadline scheduling, and resource limits, to be specified and enforced within the context of the compute engine 120. Domain constructors may optionally be parameterized by a resource view. This identifies a set of computing resources to be used to hold aggregate of data and perform computations. Such resources may have private memory (e.g., node memory 138) and very different characteristics from the main memory 114 of the non-DP host 110. As a logical construct, the computer engine refers to this set of resources. Treated herein simply as an opaque type:

Pseudocode 5

```
typedef ... resource_view;
```

DP Call-Site functions

With this new approach, a DP call-site function call may be applied to aggregate of data associated with DP capable hardware (e.g., of the compute engine 120) to describe DP computation. The function applied is annotated to allow its use in a DP context. Functions may be scalar in nature in that they are expected to consume and produce scalar values, although they may access aggregate of data. The functions are applied elementally to at least one aggregate of data in a parallel invocation. In a sense, functions specify the body of a loop, where the loop structure is inferred from the structure of the data. Some parameters to the function are applied to just elements of the data (i.e., streaming), while aggregate of data may also be passed like arrays for indexed access (i.e., non-streaming).

A DP call-site function applies an executable piece of code, called a kernel, to every virtual data parallel thread represented by the compute domain. This piece of code is called the "kernel" and is what each processing element (e.g., 140-146) of a compute node executes.

Described herein are implementations of four different specific DP call-site functions that represent four different DP primitives: forall, reduce, scan, and sort. The first of the described DP call-site functions is the "forall" function. Using the forall function, a programmer may generate a DP nested loop with a single function call. A nested loop is a logical structure where one loop is situated within the body of another loop. The following is an example pseudocode of a nested loop:

Pseudocode 6

```
for (int i=0; i<N; i++)
    for (int j=0; j<=i; j++)
        x(i,j) = foo(y(i,j), z(i,j));
    ...
```

In a traditional serial execution of the above nested loop, the first iteration of the outer loop (i.e., the i-loop) causes the inner loop (i.e., the j-loop) to execute. Consequently, the example nested function "foo(y(i,j), z(i,j))", which is inside the inner j-loop, executes serially j times for each iteration of the i-loop. Instead of a serial execution of a nested loop code written in a traditional manner, the new approach offers a new DP call-site function called "forall" that, when compiled and executed, logically performs each iteration of the nested function (e.g., "foo(y(i,j), z(i,j))") in parallel (which is called a "kernel").

A perfect loop nest is a collection of loops such that there is a single outer loop statement and the body of every loop is either exactly one loop or is a sequence of non-loop statements. An affine loop nest is a collection of loops such that there is a single outer loop statement and the body of every loop is a sequence of possible-loop statements. The bounds of every loop in an affine loop are linear in the loop induction variables.

At least one implementation of the DP call-site function forall is designed to map affine loop nests to data parallel code. Typically, the portion of the affine loop nest starting with the outer loop and continuing as long as the loop next are perfect, is mapped to a data parallel compute domain and then the remainder of the affine nest is put into the kernel.

A pseudocode format of the forall function is shown here:

Pseudocode 7

```
template<typename index_domain,typename kernelfun,
    typenameFields... >
    void forall(index_domain d,
        kernelfun foo,
        Field... fields) { ... }
```

The basic semantics of this function call will evaluate the function "foo" for every index specified by domain "d" with arguments from corresponding elements of the fields, just as in the original loop.

This is an alternative format of the pseudocode for the forall function:

Pseudocode 8

```
grid<2> cdomain(height, width);
field<2, double> X(cdomain), Y(cdomain), Z(cdomain);
```

Pseudocode 8

```
forall(cdomain,
        [=] __declspec(vector) (double &x,
                double y,
                double z ) {
            x = foo(y,z);
        }, X, Y, Z);
```

In the example pseudocode above, the forall function is shown as a lambda expression, as indicated by the lambda operator "[=]". A lambda expression is an anonymous function that can construct anonymous functions of expressions and statements, and can be used to create delegates or expression tree types.

In addition, the effect of using by-value to modify double "y" and "z" has benefit. When a programmer labels an argument in this manner, it maps the variable to read-only memory space. Because of this, the program may execute faster and more efficiently since the values written to that memory area maintain their integrity, particularly when distributed to multiple memory systems. Therefore, using this "const" label or another equivalent label, the programmer can increase efficiency when there is no need to write back to that memory area.

Another of the specific DP call-site functions described herein is the "reduce" function. Using the reduce function, a programmer may compute the sum of very large arrays of values. A couple of examples of pseudocode format of the reduce function are shown here:

Pseudocode 9

```
template<typename domain_type,
        typename reducefun,   typename result_type,
        typename kernelfun,   typename Fields....>
void reduce(domain_type d,
        reducefun r, scalar<result_type> result,
        kernelfun f, Fields... fields) { ... }
template<unsigned dim, unsigned rank,
        typename reducefun,   typename result_type,
        typename kernelfun,   typename Fields....>
void reduce(grid<rank> d,
        reducefun r, field<grid<rank-1>,result_type> result,
        kernelfun f, Fields... fields) { ... }
```

With of these examples, "f" maps to a value of "result_type". Function "r" combines two instances of this type and returns a new instance. It is assumed to be associative and commutative. In the first case, this function is applied exhaustively to reduce to a single result value stored in "result". This second form is restricted to "grid" domains, where one dimension is selected (by "dim") and is eliminated by reduction, as above. The "result_field" input value is combined with the generated value via the function "r", as well. For example, this pattern matches matrix multiply-accumulate: A=A+B*C, where the computation grid corresponds to the 3-dimensional space of the elemental multiples.

Still another of the specific DP call-site functions described herein is the "scan" function. The scan function is also known as the "parallel prefix" primitive of data parallel computing. Using the scan function, a programmer may, given an array of values, compute a new array in which each element is the sum of all the elements before it in the input array. An example pseudocode format of the scan function is shown here:

Pseudocode 10

```
template<unsigned dim, unsigned rank,
        typename reducefun,   typename result_type,
        typename kernelfun,   typename Fields....>
void scan(grid<rank> d,
        reducefun r, field<grid<rank>,result_type> result,
        kernelfun f, Fields... fields) { ... }
```

As in the reduction case, the "dim" argument selects a "pencil" through that data. A "pencil" is a lower dimensional projection of the data set. For example, consider a two-dimensional matrix of extents 10×10. Then, a pencil would be the fifth column. Or consider a three-dimensional cube of data, then a pencil would be the xz-plane at y=y0. In the reduction case, that pencil was reduced to a scalar value, but here that pencil defines a sequence of values upon which a parallel prefix computation is performed using operator "r," here assumed to be associative. This produces a sequence of values that are then stored in the corresponding elements of "result."

The last of the four specific DP call-site functions described herein is the "sort" function. Just as the name implies with this function, a programmer may sort through a large data set using one or more of the known data parallel sorting algorithms. The sort function is parameterized by a comparison function, a field to be sorted, and additional fields that might be referenced by the comparison. An example pseudocode format of the sort function is shown here:

Pseudocode 11

```
template<unsigned dim, unsigned rank
        typename record_type, typename Fields... >
void sort(grid<rank>  d,
        int cmp(record_type&, record_type&),
        field<grid<rank>, record_type> sort_field,
        Fields... fields) { ... }
```

As above, this sort operation is applied to pencils in the "dim" dimension and updates "sort_field" in its place.

Other Programming Concepts

Based upon the arguments of a DP call-site, the DP call-site function may operate on two different types of input parameters: elemental and non-elemental. Consequently, the compute nodes (e.g., 122-136), generated based upon the DP call-site, operate on one of those two different types of parameters.

With an elemental input, a compute node operates upon a single value or scalar value. With a non-elemental input, a compute node operates on an aggregate of data or a vector of values. That is, the compute node has the ability to index arbitrarily into the aggregate of data. The calls for DP call-site functions will have arguments that are either elemental or non-elemental. These DP call-site calls will generate logical compute nodes (e.g., 122-136) based upon the values associated with the function's arguments.

In general, the computations of elemental compute nodes may overlap but the non-elemental computer nodes typically do not. In the non-elemental case, the aggregate of data will need to be fully realized in the compute engine memory (e.g., node memory 138) before any node accesses any particular element in the aggregate of data. Because an aggregate of data based upon a non-elemental parameter may be incrementally produced and consumed, less memory is needed as compared to the use of elemental input parameters.

For the DP call-site functions, it is not necessary that kernel formal parameter types match the actual types of the arguments passed in. Assume the type of the actual is a field of rank Ra and the compute domain has rank Rc.

1. If the type of the formal is not a field, but is the same type (modulo const and reference) as the element type of the actual field, then there is a valid conversion whenever:

$R_a = R_c$

2. If the type of the formal is a field (modulo const and reference) of rank $R_f$, then there is a valid conversion whenever:

$R_a = R_f + R_c$.

3. To be complete, there is the identity conversion, where the formal and actual types match:

$R_a = R_f$

As an example to illustrate conversion 1, consider vector addition with kernel:

```
__declspec(kernel)
    void vector_add(double& c, double a, double b)
    c = a + b;
}
```

The actuals for the DP call-site function are:

```
grid domain(1024, 1024);
    field<2, double> A(domain), B(domain), C(domain);
```

Then a call-site takes the form:

```
forall(C.get_grid( ), vector_add, C, A, B);
```

The following conversions:

```
C -> double& c
A -> double a
B -> double b
``` work by treating the whole of the field aggregates exactly the same in the kernel vector_add. In other words, for every two indices:

index<2> idx1, idx2 in domain, C[idx1] and C[idx2] (resp., A[idx1] and A[idx2], B[idx1] and B[idx2]) are treated identically in the kernel vector_add.

These conversions are called elemental projection. A kernel is said to be elemental if it has no parameter types that are fields. One of the advantages of elemental kernels includes the complete lack of possible race conditions, dead-locks or live-locks, because there is no distinguishing between the processing of any element of the actual fields.

As an example to illustrate conversion 2, consider vector addition with kernel:

Pseudocode 12

```
__declspec(kernel)
    void sum_rows(double& c, const field<1, double>& a) {
        int length = a.get_extents(0);
        // create a temporary so that a register is accessed
        //    instead of global memory
        double c_ret = 0.0;
        // sum the vector a
        for (int k = 0; k < length; ++k)
            c_ret += a(k);
        // assign result to global memory
        c = c_ret;
    }
```

The actuals for the DP call-site function are:

```
grid domain(1024, 1024), compute_domain(1024);
    field<2, double> A(domain), C(comput_domain);
```

Then a call-site takes the form:

```
forall(C.get_grid( ), sum_rows, C, A);
```

Of the following conversions:

```
C -> double& c
A -> const field<1, double>& a,
```

The first one is elemental projection covered above in conversion 1. For the second one, the left index of elements of A are acted on by the kernel sum_rows, while the compute domain fills in the right index. In other words, for a given 'index<1> idx' in compute domain, the body of sum_rows takes the form:

```
int length = a.get_extents(0);
        // create a temporary so that a register is accessed
        // instead of global memory
        double c_ret = 0.0;
        // sum the vector a
        for (int k = 0; k < length; ++k)
            c_ret += a(k, idx[0]);
        // assign result to global memory
        C[idx] = c_ret;
```

This is called partial-projection and one of the advantages includes that there is no possibility of common concurrency bugs in the indices provided by the compute domain. The general form of partial projection is such that the farthest right 'Rf' number of indices of the elements of A are acted on by the kernel with the rest of the indices filled in by the compute domain, hence the requirement:

$R_a = R_f + R_c$.

As a slightly more complex example of conversion, consider:

```
                            Pseudocode 13
___declspec(kernel)
    void sum_dimensions(double& c, const field<Rank_f, double>& a)
{
        double c_ret = 0.0;
        for (int k0 = 0; k0 < a.get_extents(0); ++k0)
            for (int k1 = 0; k1 < a.get_extents(1); ++k1)
                .....
                    for (int kf = 0; kf < a.get_extents(Rank_f - 1);
++kf)
                        c_ret += a(k0, k1, ..., kf);
        c = c_ret;
}
```

With actuals:

```
        const int N, Rank_f;
        int extents1[N], extents2[N+Rank_f];
        grid domain(extents2), compute_domain(extents1);
        field<2, double> A(domain), C(comput_domain);
```

Then a call-site takes the form:

```
        forall(C.get_grid( ), sum_dimensions, C, A);
```

For the following conversion:

```
        A -> const field<rank_f, double>& a,
```

One interpretation of the body of the kernel includes:

```
                            Pseudocode 14
    Let index<N> idx;
    i0 = idx[0];
    i1 = idx[1];
    ...
    iN = idx[N−1]
    double c_ret = 0.0;
    for (int k0 = 0; k0 < a.get_extents(0); ++k0)
        for (int k1 = 0; k1 < a.get_extents(1); ++k1)
            .....
                for (int kf = 0; kf < a.get_extents(Rank_f - 1);
++kf)
                    c_ret += a(k0, k1, ..., kf, i0, i1, ..., iN−1);
    c(i0, i1, ..., iN−1) = c_ret;
```

A slightly more complex example is matrix multiplication using the communication operators transpose and spread.

Given 'field<N, T> A, transpose<i, j>(A) is the result of swapping dimension i with dimensions j. For example, when N=2, transpose<0,1>(A) is normal matrix transpose: transpose<0,1>(A)(i,j)→A(j,i).

On the other hand, spread<i>(A), is the result of adding a dummy dimension at index I, shifting all subsequent indices to the right by one. For example, when N=2, the result of spread<1>(A) is a three dimensional field where the old slot-0 stays the same, but the old slot-1 is moved to slot-2 and slot-1 is a dummy: spread<1>(A)(i, j, k)=A(i, k).

Using the kernel:

```
                            Pseudocode 15
___declspec(kernel)
    void inner_product(float& c,
                       const field<1, float>& a,
                       const field<1, float>& b) {
        double c_ret = 0.0;
        for (int k = 0; k < a.get_extents(0); ++k)
            c_ret += a(k)*b(k);
        c = c_ret;
}
```

With actuals:

```
        grid domain(1024, 1024);
        field<2, double> C(domain), A(domain), B(domain);
```

Then matrix multiplication is the following DP call-site function:

```
                            Pseudocode 16
    forall(C.grid( ), inner_product, C,
            // spread<2>(transpose(A))(k,i,j) -> transpose(A)(k,i) -
> (i,k)
            spread<2>(transpose(A)),
            // spread<1>(B)(k,i,j) -> (k,j)
            spread<1>(B));
```

The inner_product kernel acts on A and B at the left-most slot (viz., k) and the compute domain fills in the two slots in the right. Essentially spread is simply used to keep the index manipulations clean and consistent.

One last example for partial projection uses the DP call-site function 'reduce' to compute matrix multiplication.

Take, for example, the following:

```
                            Pseudocode 17
    reduce<1>(grid<3>(
            // i, j, k
            c.grid(0),c.grid(1),a.grid(1)),
            // transform that performs the actual reduction
            [=](double x, double y)->double{ return x + y; },
            // target
            c,
            // map
            [=](double x, double y)->double{ return x * y; },
            // spread<1>(a)(i,j,k) => i,k
            spread<1>(a),
            // spread<0>(transpose(b))(i,j,k) =>
    transpose(b)(j,k) => (k,j))
            spread<0>(transpose(b));
```

Since reduce operates on the right-most indices, the use of transpose and spread is different from before. The interpretation is that reduce<1> reduces the right-most dimension of the compute domain.

The two functions (viz., lambdas) are used analogously to map-reduce:

---
map: { {x0, y0}, {x1, y1}, ..., {xN, yN} } => {
map(x0,y0), map(x1, y1), ..., map(xN, yN) };
    reduce: => transform(map(x0, y0), transform(map(x1, y1),
transform(... , map(xN, yN))...));
---

Or:

Pseudocode 18

---
map: { {x0, y0}, {x1, y1}, ..., {xN, yN} } => { x0*y0, x1*y1,
..., xN*yN };
    reduce: => x0*y0 + x1*y1 + ... + xN*yN;
---

As an example illustrating conversion 3, let N=K+M and consider:

Pseudocode 19

---
\_\_declspec(kernel)
void sum\_dimensions(const index<K>& idx,
        field<K, double>& c,
          const field<N, double>& a) {
  double c\_ret = 0.0;
  for (int $k_0$ = 0; $k_0$ < a.get\_extents(0); ++$k_0$)
    for (int $k_1$ = 0; $k_1$ < a.get\_extents(1); ++ $k_1$)
     .....
        for (int $k_{M-1}$ = 0; $k_{M-1}$ < a.get\_extents(M − 1); ++$k_{M-1}$)
          c\_ret += a($k_0$, $k_1$, ..., $k_{M-1}$, idx[0], idx[1], ..., idx[K−1]);
  c[idx] = c\_ret;
}
---

Pseudocode 20

---
const int K, M, N; // N = K + M
int extents1[K], extents2[N];
grid domain(extents2), compute\_domain(extents1);
field<2, double> A(domain), C(compute\_domain);
---

Then a call-site takes the form:

---
forall(C.get\_grid( ), sum\_dimensions, C, A);
---

And all conversions are identity conversions.

When creating memory on the device, it starts raw and then may have views that are either read-only or read-write. One of the advantages of read-only includes that when the problem is split up between multiple devices (sometimes called an out-of-core algorithm), read-only memory does not need to be checked to see if it needs to be updated. For example, if device 1 is manipulating chunk of memory, field 1, and device 2 is using field 1, then there is no need for device 1 to check whether field 1 has been changed by device 2. A similar picture holds for the host and the device using a chunk of memory as a field. If the memory chunk is read-write, then there would need to be a synchronization protocol between the actions on device 1 and device 2.

When a field is first created, it is just raw memory and it is not ready for access; that is it does not have a 'view' yet. When a field is passed into a kernel at a DP call-site function, the signature of the parameter type determines whether it will have a read-only view or a read-write view (there can be two views of the same memory.

A read-only view will be created if the parameter type is by-value or const-by-reference, viz., for some type 'element type'

Pseudocode 21

---
element\_type x
field<N, element\_type> y
const field<N, element\_type>& z
read\_only\_field<field<2, element\_type>> w
---

A read-write view will be created if the parameter type is a non-const reference type:

---
element\_type& x
field<N, element\_type>& y.
---

A field can be explicitly restricted to have only a read-only view, where it does not have a read-write view, by using the communication operator:

---
read\_only.
---

The read\_only operator works by only defining const accessors and index operators and subscript operators and hence:

---
read\_only(A)
--- is used in a way that causes a write. In particular, if passed into a kernel (through a DP call-site function), a compiler error may occur.

For example, in one embodiment, the distinction would be between:

Pseudocode 22

---
element\_type x
    field<N, element\_type> y
    const field<N, element\_type>& z
and
element\_type& x
field<N, element\_type>& y.
---

While in another embodiment, the distinction would be between:

---
element\_type x
    read\_only\_field<field<2, element\_type>> w
and
---

```
    element_type& x
    field<N, element_type> y.
```

The first embodiment uses by-val vs. ref and const vs. non-const to distinguish between read-only vs. read-write. The second embodiment uses by-val vs. ref only for elemental formals, otherwise for field formals it uses read_only_field vs. field to distinguish between read-only vs. read-write. The reasoning for the second is that reference is really a lie when the device and host have different memory systems.

More on the DP Forall Function

The forall function is a highly versatile DP primitive. A host of DP activities may be launched using the forall function. The compiler 116 expands an invocation of the forall function to a sequence of code that prepares data structures and finally launches the parallel activities. The compiler 166 also generates a stub (e.g., invocation stubs 118) that glues the launching point to the computation (i.e., the kernel parameter of a forall function), maps physical thread indices to logical indices of the current parallel activity in the compute domain and passes these special logical indices to the kernel function if it requests so, implements the projection semantics, and finally invokes the kernel function. The compiler 116 performs at least two functions:

- The compiler 116 expands an invocation of DP function (such as a forall) to a sequence of non-DP executable code (which will execute on the non-DP host 110) that prepares the necessary data structures and finally launches the parallel activities.
- The compiler 116 also generates a stub (i.e., device code, e.g., HLSL) that glues the launching point to the unit computation (the kernel parameter of a DP function), implements the projection semantics and special index tokens of the DP function, and all other setup for the target device.

The compiler 116 takes this burden off of programmers' shoulders and lets them focus on programming the functionality of the program itself. In addition, leaving this job to the compiler opens up opportunities for data parallel programs to be written-once and run-on-multiple-targets. That is, the compiler can generate different invocation stubs for different targets, and let the runtime choose the appropriate one depending on the runtime request.

The following is another example of pseudocode of the DP primitive forall and, in this example, a kernel is invoked with three parameters:

Pseudocode 23

```
/// <summary>
///     Executes a kernel with three arguments in parallel
/// </summary>
template <typename __Callable_type,
    typename __Actual_type1,
    typename __Actual_type2,
    typename __Actual_type3,
    size_t __Compute_rank>
void forall(const grid<__Compute_rank> & __Compute_grid,
        const __Callable_type & __Kernel,
        const __Actual_type1 & __Actual1,
        const __Actual_type2 & __Actual2,
        const __Actual_type3 & __Actual3);
```

The first parameter ("const grid<_Compute_rank> & _ Compute_grid") is the compute domain, which describes how to deploy the parallel activities. That is, how work can be done in parallel and how the deployment maps back to the data, etc. The second parameter ("const _Callable_type & _ Kernel") is the kernel that is the unit computation and will be invoked in parallel by all parallel activities. The rest of the parameters (_Actual1, _Actual2, _Actual3) are the arguments that correspond to the kernel's parameters. At least one implementation of the described techniques herein is directed towards the mapping between these forall arguments and kernel's parameters.

These terms are used herein:

Parameter Rank. (i.e., the DP rank of a type) This is the first template argument. For example, the rank of field<2, int> is 2. For a type other than field, its rank is 0.

Actual parameter rank ($R_a$). The rank of actual arguments passed to a DP function, such as a forall (_Actual_type1~_Actual_type3 in above example pseudocode 13).

Formal parameter rank ($R_f$). The rank of formal parameter types of the kernel.

Compute rank ($R_c$). When an instance of grid is used as the first parameter of forall. For example, if the type of the first argument is grid<2>, the compute rank is 2.

The DP rank of a type introduces a concept called "indexable type", which is a generalization of field. An indexable type is a type that has a rank (a compile time known static const member named rank) as field does, and implements operator[ ] that takes an instance of index<rank> as input, and returns an element value or reference. Optionally, it can implement full or partial project functions. The parameter rank of such type is the rank of the given indexable type. The parameter rank of a non-indexable type is zero The actual parameter rank ($R_a$) is not necessarily the same as the formal parameter rank ($R_f$). The following is a simple example kernel that just adds two values and assigns the sum to the first parameter:

Pseudocode 24

```
__declspec(vector) void add(int & c, int a, int b)
{
    c = a + b;
}
```

This kernel may be invoked in this manner

Pseudocode 25

```
grid<1> vector(rv, N);
field<1, int> fA(vector);
field<1, int> fB(vector);
field<1, int> fC(vector);
...
forall(vector, add, fC, fA, fB);
```

This example forall of pseudocode 15 launches N parallel activities, each adding one element from two vectors (fA and fB), respectively, and stores the result back to the corresponding slot of the result vector (fC). In this example, $R_c$ is 1, $R_a$ is (1, 1, 1), and $R_f$ is (0, 0, 0), and the compiler 116 generates the glue code to bridge $R_a$ to $R_f$. The compiler 116 identifies the position of the current parallel activity in the whole computation, loads the corresponding elements from fA and fB, invokes the kernel function, and stores the result to the right element of fC.

Note that the same kernel can be invoked for different data. For example, the programmer can write the following code to invoke the add computation over matrices instead of vectors:

---
Pseudocode 26
---
```
grid<2> matrix(rv, M, N);
field<2, int> fA(vector);
field<2, int> fB(vector);
field<2, int> fC(vector);
...
forall(matrix, add, fC, fA, fB);
```
---

Without the compiler 116 taking care of the invocation stubs, the programmer needs to either write a wrapper around the core computation algorithm (here, the add function) for each possible kind of data input or replicate the same algorithm many times with slightly different structures. Taking this burden off the programmers significantly improves the reusability of core kernel code and makes the whole program a lot cleaner and more concise.

Of course, for some algorithms, each kernel needs to see the whole input data in order to perform the required computation, in which case, $R_f$ is the same as $R_a$. In this instance, the invocation stub's job is just to identify the position of the current parallel activity and then invoke the kernel with passed parameters.

Sometimes, the position of a parallel activity in the whole parallel deployment is necessary in order to program the kernel. In this case, the kernel can get this positional information via defining an index type parameter with the same rank of the compute rank, and using a special token (e.g., index) at the forall's corresponding parameter position. Another alternative involves allowing the kernel function to have one more parameter than the arguments provided to the forall invocation, and the first parameter of the kernel function must be index<compute rank>. In this case, the compiler will generate code in the stub that passes the logical index (the position of the parallel activity in the whole parallel deployment) to the kernel function.

The following kernel example computes one element for matrix multiplication:

---
Pseudocode 27
---
```
__declspec(vector) void mxm_kernal_naive(index<2> cIdx,
    float & c, const field<2, float> & mA, const field<2, float> & mB)
{
    c = 0.0;
    for (unsigned int k = 0; k < mA.get_extent(1); k++)
    {
        index<2> aIdx(cIdx[0], k);
        index<2> bIdx(k, cIdx[1]);
        c += mA[aIdx] * mB[bIdx];
    }
}
```
---

Given the above kernel, the program may invoke it like this (for example):

---
Pseudocode 28
---
```
grid<2> gA(rv, M, W), gB(rv, W, N), gC(rv, M, N);
field<2, float> mA(gA), mB(gB), mC(gC);
...
```
---

-continued
---
Pseudocode 28
---
```
forall(mC.get_grid( ), mxm_kernel_naive, mC, mA, mB);
```
---

The compiler 116 generates code in the invocation stub that creates the correct instance of index<2>, which represents the position of the current parallel activity, and passes it to mxm_kernel_naive as its first argument.

Two other special index tokens that may be used include: "_tile_index" and "_local_index". They represent the position of the current parallel activity when the kernel is invoked on a tiled compute domain. _tile_index gives the index of the tile to which the current parallel activity belongs, and _local_ index provides the position of the current parallel activity within that tile. These two tokens can be used in the similar way as _index, and the compiler 116 generates code in the invocation stub to set them up appropriately and pass them to the kernel, if any of them are requested at the forall invocation site.

Alternatively, instead of a special token, a new type index_group may be used to encapsulate all possible special indices, global, local, or group. The tokens may be implicit forall arguments and will be inserted by the compiler if the target kernel requests so.

The actual arguments of a forall invocation are data that will be passed to the target compute engine. They correspond to the parameters of the kernel one-by-one, but the type of each argument is not necessarily the same as its corresponding parameter type. Three kinds of arguments are allowed for a forall:

- An instance field<N,T>, which indicates a memory region on device memory. This will be mapped to a device resource, e.g., a buffer.
- A non-field type data structure, which will be copied by value to the device. On some platforms, such data is passed via a specialized constant marshaling mechanism.
- A special index token. These tokens correspond to the position of the current parallel activity in the compute domain. They are provided so that programmers can write a non-elemental kernel without being explicitly exposed to the target compute engine's thread deployment model. To use _index, programmers define the kernel parameter to be index<N>, where N is the rank of compute domain, and use the desired token at the corresponding argument position of the forall invocation site. _tile_index and _local_index are used for a tiled deployment of parallel activities.

Parameter projection is the rank of an actual argument of a DP function (e.g., a forall) and is not necessarily the same as the rank of its corresponding kernel parameter. If $R_f + R_c = R_a$, the compiler generates code to project the given field argument to the appropriate rank that the kernel expects using the position information of the given parallel activity. It is also possible to do automatic tiling, if $R_f + R > R_a$.

Thread Deployment Strategy and Index Mapping

In some scenarios (e.g., Microsoft's DirectCompute™ platform), threads may be dispatched in a three dimensional space, where three values are used to specify the shape of a group of threads, and three additional dimensions are used to specify the shape of blocks of threads which are scheduled together, commonly referred to as thread groups.

When generating the invocation stub, the compiler (e.g., compiler 116) chooses a thread deployment strategy and it generates corresponding index mapping code that identifies (e.g., maps) the position of the current parallel activity in the compute domain based upon the target-dependent compute unit identity (which is available at runtime, not accessible to the compiler). As part of this, the compiler picks a physical domain to cover the logical domain and dispatch it accordingly. The compiler also generates code, which will be executed by each thread, to map a given point in the three-dimensional blocked physical thread domain back to a point in the logical compute domain.

Some of the considerations that guide the selection of the index mapping includes (by way of example and not limitation):

The mapping may be easily extensible, in the sense that it should be easy to define new logical domains and their mapping to diverse physical domains.

There are recommended sizes to use for the extents of thread groups. For example, they should not be too small (many other such size considerations exist, and are not the topic of this background presentation).

The reverse mapping from physical to logical should be easy to compute and preferably direct such that:
 a. Not too much time is spent in this prelude to the actual computation of the thread in the kernel.
 b. The mapping between physical and logical domains is visible to the compiler such that the compiler can enable optimizations, which depend on the usage of the physical indices. For example, if an array is accessed using an integer variable i, then it is advantageous for the compiler to know how i is related to the thread identifier in the physical domain.

The amount of redundant threads scheduled is diminished or is zero.

The number of platform API invocations needed to "cover" a logical domain is low (or 1-to-1, in the ideal case).

A logical compute domain is the 0-based dense (unit stride) cuboid shaped domain, characterized by an N-dimensional non-negative vector of extents $E=<E_0, \ldots, E_{N-1}>$ such that an index $i=<i_0, \ldots i_{N-1}>$ is in the domain if and only if for each $i_j$ component of it holds that $0<=i_j<E_j$. For example, in two-dimensions, a cuboid is simply a rectangle with one corner anchored at the $<0, 0>$ origin and the opposite corner is at $<E_0, E_1>$ for some non-negative $E_0$ and $E_1$ .... Herein, a cuboid shaped domain will be called a grid for brevity.

To aid description, let's use the following notations in this document:
 (Gz, Gy, Gx)—The extents of thread groups (Gx is the least significant dimension)
 (Tz, Ty, Tx)—The extents of each thread group (Tx is the least significant dimension)
 gid—The SV_GroupID, (gid[0], gid[1], gid[2]) is a point in (Gz, Gy, Gx)
 gtid—The SV_GroupdThreadID, (gtid[0], gtid[1], gtid [2]) is a point in (Tz, Ty, Tx)
 dtid—The SV_DispatchThreadID, (dtid[0], dtid[1], dtid [2]) is a point in (Gz*Tz, Gy*Ty, Gx*Tx)

There are multiple approaches for mapping between logical and physical domains which are provided below. Given an instance of compute_grid, say g.

Approach 1: Naïve Mapping for Grids

Thread dispatch: The host may determine the dimensions of the physical grid to dispatch thusly (by way of example):
 1. (Tz, Ty, Tx)=(1, 1, 256), this predefined number can be tuned based on scenarios;
 2. (Gz, Gy, Gx)=(1, 1, div_ceil (g.total_elements( ) 256)); If Gx>MAX_GROUPS, report an error. Pseudocode may look like this (for example):

Pseudocode 29

```
template<size_t N>
void get_dispatch_extents1(extents<N> g, size_t & Gx, size_t &
Gy, size_t & Gz)
{
    Gx = div_ceil(g.total_elements( ), 256);
    Gy = 1;
    Gz = 1;
    if (Gx >= 64K) throw exception(..);
}
```

A "div_ceil" takes two integers a and b, and performs (a+b−1)/b in C++ integer math. In other words, it divides the numbers as rational numbers and rounds the result up to the next integer.

Index mapping code-generation: Given gid/gtid/dtid, flatten it to a linear offset, and then raise it to an index in the N-Dimension logical domain based on g's extents. Pseudocode may look like this (for example):

Pseudocode 30

```
// Given a linear offset between 0 and total number of threads
minus one,
// raise it to an index in an N-dimensional grid whose shape is
given in
// 'extents'
template <int N>
index<N> raise(__int64 offset, extents<N> shape)
{
    index<N> idx;
    __int64 extent = shape.total_elements( );
    for (size_t i = 0; i < N; i++) {
        extent /= shape[i];
        idx[i] = int(offset / extent);
        offset = offset % extent;
    }
    return idx;
}
// dtid -- The dispatch thread id, SV_DispatchThreadID
// g -- The compute_grid instance
template<size_t N>
void stub1(index<3> dtid, compute_grid<N> g)
{
    // we only use the least significant dimension (DimX )in the
physical domain.
    size_t offset = dtid[DimX];
    // filter out the extra physical that threads cannot be mapped
to the
    // logical domain
    if (offset < g. total_elements( ))
    {
        index<N> logical_idx = raise<N>(offset, g.m_shape);
        ... // execute kernel body
    }
}
```

For example, if the compute grid is 289 by 2050, the physical thread domain may be arranged as:
 (Tz, Ty, Tx)=(1, 1, 256)
 (Gz, Gy, Gx)=(1, 289, 9)
the dimension of SV_DispatchThreadID will be (1, 289, 2304), which is almost the same as the logical compute grid with some extra points. Now given a dtid (the variable name commonly referring to the DirectCompute three-dimensional thread ID) in the space of (1, 289, 2304), one may detect whether it's within the boundary of (289, 2050) (ignore dtid [DimZ] since it's 0 in this case). If it's indeed within the boundary, dtid can be used directly as the index in the logical domain without any index flattening and raising (after taking care of the difference of dimension ordering between the logic and physical domain). In addition to saving the costs of some mathematical operations, the two-dimensional physical ID may also better capture the relationship between the two-dimensional thread grid and two-dimensional data structures which the program accesses. This is relevant for code generation in vector machines, and for compile-time bounds checking.

Approach 2: Optimize for Rank 1, 2, and 3

Thread dispatch: The host may determine the dimensions of the physical grid to dispatch thusly (by way of example):
1. (Tz, Ty, Tx)=(1, 1, 256), this predefined number can be tuned based on scenarios. It is assumed here that these extents are conveyed through the constants vector thread_group_extents.
2. If the rank is 1, 2 and 3, try to use the same number of dimensions in the physical domain as the logical domain. The dispatch decision (Gz, Gy, Gx) is passed out via physical_group_grid. Pseudocode may look like this (for example):

Pseudocode 31

```
template<size_t N>
void get_dispatch_extents2(
    compute_grid<N> g, extents<3> & physical_group_grid)
{
    if (N <= 3)
    {
        for(i = 0; i < 3-N; i++)
        {
            physical_group_grid[i] = 1;
        }
        for(i = 3-N; i < 3; i++)
        {
            physical_group_grid[i] = div_ceil(g[i-(3-N)],
thread_group_extents[i]);
        }
        if (max(physical_group_grid) < MAX_GROUPS) return;
    }
    // evenly distribute points in the logical domain to the 3
phyical dimensions
        __int64 total =
            div_ceil(g.total_elements( ),
thread_group_extents.total_elements( ));
        physical_group_grid[0] = ceil(pow(double(total),
double(1)/dobule(3)));
        __int64 leftover = div_ceil(total, physical_group_grid[0]);
        physical_group_grid[1] = ceil( pow(double(leftover),
double(1)/dobule(2)));
physical_group_grid[2]=div_ceil(leftover,physical_group_grid[1]);
    if (max(physical_group_grid) >= MAX_GROUPS) throw
exception(...);}
```

Note how the get_dispatch_extents2 tries to map each of the logical dimensions to the corresponding physical dimensions, if N<=3. If that is not possible, the approach "spreads" the entire required set of groups (captured by the variable "total") across three physical dimensions. The values of Gz, Gy, Gx (which are the values stored in the output array physical_group_grid) are chosen close to the cubic root of the total number of groups necessary. The product of Gz, Gy and Gx may actually be greater than the number of groups required. There may be a reduction in the amount of "wasted" groups by using the result of the first rounding-up (in Gz) to further divide the remaining number of groups to schedule. This may result in slightly lower leftover values for Gy and subsequently for Gx.

This is just one form of optimization in the general task of:
Find values of G such that
Each Gi<MAX_GROUPS
Gz*Gy*Gx>=total groups required
Gz*Gy*Gx is minimal A perfect match such that Gz*Gy*Gz equals (exactly) "total" is an optimal result, but such factors do not always exist (e.g. if "total" is prime). In general, the bigger the value of total is, the more willing is the runtime to try to optimize the selection of Gz, Gy, Gx. However, with MAX_GROUPS equal to 64K and with the cubic root based solution from the above approach, the amount of wasted groups is a fraction of a single percent. Therefore, the cubic root method is useful for practical purposes.

Given the above code for determining the dimensions of the scheduling grid, this is how the stub recovers the logical index from physical indices. Given gid/gtid/dtid, based on the rank N, and given which scheduling strategy was selected above (direct mapping vs. indirect mapping), different index calculation code is generated.

case1: N==1, directly mapped:

Pseudocode 32

```
// dtid -- The dispatch thread id, SV_DispatchThreadID
// g -- The compute_grid instance
void stub2(index<3> dtid, extents<1> g)
{
    index<1> logical_idx(dtid[DimX]);
    // filter out extra physical threads cannot be mapped to
the logical domain
        if (logical_idx[0] < g.total_elements( ))
        {
            ... // execute kernel body here
        }
}
``` case2: N==2, directly mapped:

Pseudocode 33

```
// dtid - The dispatch thread id, SV_DispatchThreadID
// g -- The compute_grid instance
void stub(index<3> dtid, extents<2> g)
{
    index<2> logical_idx(dtid[DimY], dtid[DimX]);
    // filter out extra physical threads cannot be mapped to
the logical domain
        if (g.within_boundary(logical_idx))
        {
            ... // execute kernel body here
        }
}
``` case 3: N==3, directly mapped:

Pseudocode 34

```
// dtid -- The dispatch thread id, SV_DispatchThreadID
// g -- The compute_grid instance
void stub(index<3> dtid, extents<3> g)
{
    index<3> logical_idx(dtid[DimZ], dtid[DimY], dtid[DimX]);
    // filter out extra physical threads cannot be mapped to
the logical domain
        if (g.within_boundary(logical_idx))
        {
            ... // execute kernel body here
        }
}
``` case 4: indirectly mapped, any N:

Pseudocode 35

```
// dtid -- The dispatch thread id, SV_DispatchThreadID
// g -- The compute_grid instance
// Gx, Gy, Gz - The physical dispatch shape
void stub(index<3> dtid, compute_grid<N> g,
extents<3> physical_group_grid)
{
    physical_group_grid
    extents<3> physical_grid =  physical_group_grid *
thread_group_extents;
        int64 offset = flatten<3>(dtid, physical_grid);
        // filter out extra physical threads cannot be mapped to
the logical domain
        if (offset < g.total_elements( ))
        {
            index<N> logical_idx = raise<N>(offset, g);
            ... // execute kernel body here
        }
}
```

The method "flatten" is the reciprocal of raise, it translates from a point in a given grid to a linear offset in the integer range [0, total elements). Here is its definition:

Pseudocode 36

```
template <int N>
    int64 flatten(index<N> index, extents<N> shape)
{
    int64 multiplier = 1;
    int64 offset = 0;
    for (int d=N-1;d>=0;d--)
    {
        offset += multiplier * index[d];
        multiplier *= shape[d];
    }
    return offset;
}
```

Approach 3: Multiple Kernel Invocations when max(Gx,Gy,Gz)>=64K

In approach #2, the physical dimensions are matched to logical dimensions such that for rank=1, 2 and 3, index mapping is direct, unless one or more dimensions need spreading. Direct mapping may be in general more efficient and better enables compiler optimizations. In the case when spreading is necessary or when the logical rank is greater than 3, the total number of groups necessary is calculated and this number is spread across three dimensions, quite evenly, by pivoting around the cubic root of the total number of groups needed. The previous approach is thusly quite general in the sense it can handle almost all inputs that are possibly mappable into the hardware in a single compute invocation. Given that MAX_GROUPSA3 is 2^48, it is unlikely that any computation will not be satisfied by the range covered by approach #2 from the previous section.

Still, approach #2 involves indirect mapping, which may end-up as a separate code path in the stub and could lead into large binary size since for rank=1, 2, and 3, two versions of stubs are typically kept to handle direct mapping and indirect mapping respectively depending on whether direct mapping is feasible for the dynamic extents of a given logical domain.

This section presents approach #3 which is an alternative, to alleviate the aforementioned concerns. Basically, for N<=3, if the logical domain doesn't fit naturally within the vector G, then multiple invocations are used, each "covering" a different portion from the logical grid.

For example, assume logical grid=(258, 258), but the physical limit for each dimension is 256 (i.e., MAX_GROUPS is 256. Also for simplicity of exposition assume that the extents of the thread group are (1,1,1). So this means that logically a (1, 258,258) thread grid is used, but, of course, this grid cannot be scheduled because the X and Y dimensions exceed MAX_GROUPS. Instead, the API platforms may be invoked four times to cover the logical space defined like this (with 4 dispatches):

Gz, Gy, Gx)=(1, 256, 256), with origin [0, 0, 0]
(Gz, Gy, Gx)=(1, 256, 2), with origin [0, 0, 256]
(Gz, Gy, Gx)=(1, 2, 256), with origin [0, 256, 0]
(Gz, Gy, Gx)=(1, 2, 2), with origin [0, 256, 256]

Other arrangements are possible, too, and the system will also sometimes have the opportunity to execute some of these dispatches in parallel, or to distribute them between devices or computers.

This origin information may be passed to the stub and used when calculating the logical index. Now the pseudocode for index calculation may look like this (for example):

case1: N==1 (always directly mapped, with origin)

Pseudocode 37

```
// dtid -- The dispatch thread id, SV_DispatchThreadID
// dtid_origin -- The origin of the given dispatch
// g -- The compute_grid instance
void stub3(index<3> dtid, index<3> dtid_origin, extents<1> g)
{
    index<1> logical_idx(dtid[DimX] + dtid_origin[DimX]);
    // filter out extra physical threads cannot be mapped to
the logical domain
    if (logical_idx[0] < g.total_elements( ))
    {
        ... // execute kernel body here
    }
}
```

The direct mapping approach is similarly adapted for N=2 and N=3. So, in the case N<=3 the mapping is direct plus origin vector, unlike the previous approach (#2) which in some cases employed indirect mapping even when N<=3 (and always when N>3).

Now for the cases where N>3 there are a couple of options. First, indirect mapping as in approach #2 may be used, but more in keeping with the spirit of the current algorithm, an N dimensional space may be "covered" by iterating over the N-3 high order dimensions and then for each fixed point in the N-3 dimensional space, apply the 3-dimensional index mapping algorithm to the rest of the remaining 3 dimensions. Pseudocode may look like this (for example):

Pseudocode 38

```
//
// Host code to dispatch over N dimensional grid N where N>3
//
foreach(index<N-3>  dtid_prefix in g.prefix<N-3>( ))
{
        Arrange to dispatch over g.suffix<3> with "dtid_prefix"
passed in
        to the below stub function
}
// dtid -- The dispatch thread id, SV_DispatchThreadID
// dtid_origin -- The origin of the given dispatch
```

-continued

Pseudocode 38

```
// dtid_prefix - The N-3 dimensional prefix
// g -- The compute_grid instance
void stub3(
     index<3>       dtid,
     index<3>       dtid_origin,
     index<N-3>     dtid_prefix
     extents<N>     g)
{
     index<N> logical_idx=dtid_prefix.concatenate(dtid_origin+dtid);
     // filter out extra physical threads cannot be mapped to the
logical domain
     if (g.within_bounds(logical_idx))
     {
         ... // execute kernel body here
     }
}
```

Approach 4: More Aggressive Thread Utilization without Multiple Invocations

In the approach #3, in order to optimize away the index flattening and raising calculation for cases when rank is 1, 2 or 3, one logical dispatch is split into several ones when the logical domain cannot fit into the physical domain nicely. In this section, approach 4 offers another option: try to map logical to physical directly, but when that's not possible, it "load-balances" the available physical domains and spreads the logical extents onto them.

Thus, this approach allows mapping many more threads in one dispatch. For sure, if the system tries to provide the appearance of atomicity or serialization of dispatches then one needs to be careful to maintain this invariant when splitting a single logical dispatch into multiple dispatches. Multiple invocations also have their overhead, especially when considering remote hardware to where they are dispatched.

On the other hand, the reverse thread ID mapping logic in the multiple invocations approach (#3) captures a very direct relationship between physical and logical ID's and as such will enable more compiler optimizations. It may also save some computation on the stub-side involved in reconstruction (although this will typically not be too significant).

In short, which approach to use depends on the performance characteristics of the system and on the underlying compiler infrastructure. As said, in this approach, a direct mapping is optimized if possible, otherwise the full thread domain is utilized with extra cost of more general and indirect index mapping code. Since each of the dispatching schemes can lead to different index mapping code in the call stub, and the dispatching scheme is picked at runtime based on whether the limits are exceeded, all versions of index mapping code can be generated in the stub, and a flag is passed at runtime to choose.

Since the general mapping in this case may obfuscate the relationship between the reconstructed logical thread ID, which is used to access data structures, and the physical thread ID, it may be advisable to replicate the kernel function call such that it appears once in the direct mapping case and once in the indirect mapping case. This will result in a larger binary, but on the other hand will enable more vectorization optimizations in the direct mapping cases, which are typically more common.

Another way to look at it is to create two stubs: one for the direct mapping cases, and another one for the indirect cases, and choose the right one to invoke at runtime.

With this approach, the thread_group_extents=(Tz, Ty, Tx)=(1, 1, 256) are picked. This predefined vector can be tuned based on scenarios and hardware characteristics. The approach does not depend on the numerical value of the components vector (in the sense it would work for any other thread_group_extents values that one may choose). In addition, it is possible to generate multiple stubs that assume different values for this value, then at runtime choose a particular version for the runtime selection criteria.

For the cases where N is 1, 2 or 3, the number of groups necessary is computed in each dimension, in a direct mapping:

1. If in each dimension requires less than MAX_GROUPS, then map directly between physical and logical groups, unless that would result in undue thread wastage (see next).
    A. When applying direct mapping in each dimension, it is possible that some dimensions in the grid will have values close to or smaller than the thread group extent in that dimension. For example, suppose that the grid specified X=1 but the thread group extents in the X dimension is 256. Since at least one group in the X dimension is used to cover the grid, but each group will only have those values within it which have X=0 produce valid points within the logical grid (e.g., (Vz, Vy, 13) will not be validly mapped to the logical grid, for any Vz or Vy). This will result in only $\frac{1}{256}$ of the threads actually contributing towards useful "coverage" of the grid. In order to prevent this situation the ratio of wastage is calculated, which is defined as the ratio between the total number of threads that we would schedule, and the total number of threads actually needed by the grid. If the wastage is beyond a certain threshold (configurable by the system, for example it could be 5%), then indirect mapping is preferred to direct mapping.
    B. Thus, if the wastage is too much, we go to step 5—fully "load-balanced" indirection of the grid.
2. Otherwise, check if the total number of groups exceeds $(MAX\_GROUPS-1)^3$. If yes, then dispatch is not possible (of course, one can resort back to multiple invocations in this unlikely case).
3. Otherwise, there is at least one dimension which requires less than MAX_GROUPS groups. There is an assumption that the dimensions specified are E1, E2 and E3 and without loss of generality assume that E1<=E2<=E3. Certainly E3>=MAX_GROUPS (or otherwise case #1 would have held), and E1<MAX_GROUPS (otherwise case #2 would have held).
4. Now, if $E2*E3<MAX\_GROUPS^2$ or if E2<MAX_GROUPS and $E1*E3<MAX\_GROUPS^2$, then the groups necessary in these two dimensions are spread across two dimensions and the third one is left directly mapped between the logical and physical domain.
    A. Note that under this clause, the groups in two logical dimensions are spread across two physical dimensions, but the structure within each group is maintained. This results in the following equations (assuming that DimX is the dimension corresponding to E1 and that E2 and E3 correspond to DimZ and DimY and that $E2*E3<MAX\_GROUPS^2$):
        i. logical_idx[DimX]=gid[DimX]*Tx+gtid[DimX]
        ii. logical_idx[DimZ ... DimY]=remap(gid[DimZ...DimY])*(Tz,Ty)+gtid[DimZ...DimY]
    B. The remapping is done at the group level so as to ensure that the reverse mapping on the X dimension is easy to compute. However, this introduces the possibility for increased wastage, as was explained in step (1.A), so similarly the level of wastage that is produced with this mapping is checked and if it exceeds a threshold then option #5 below is next.
5. Otherwise, if none of the direct mapping or semi-direct mapping conditions above applied, general mapping is resorted to.

Example pseudocode for the dispatch and the stub is elaborated below (by way of example and not limitation):

---
Pseudocode 39
---

```
struct physical_dispatch_info
{
    extents<3> physical_group_grid;
    int dispatch_mode;
    extents<3> virtual_group_grid;
};
struct physical_thread_info
{
    index<3> local_id;
    index<3> global_id;
    index<3> group_id;
};
template<size_t N>
void determine_dispatch_dims(
    const extents<N>& g,
    physical_dispatch_info& r
)
{
  C_ASSERT(N>0);
  // Validate input
  for (int i=0; i<N; i++)
  {
    if (g[i] <= 0) throw NULL;
  }
  // Validate capacity
    __int64 max_possible_threads =
      (__int64 (MaxGroupsInDim)-1) * thread_group_extents[DimZ] *
      (__int64 (MaxGroupsInDim)-1) * thread_group_extents[DimY] *
      (__int64 (MaxGroupsInDim)-1) * thread_group_extents[DimX] ;
  if (g.total_elements( ) > max_possible_threads) throw NULL;
  r.dispatch_mode = 0; // undetermined initially
  if (N <= 3)
  {
    for(int i = 0; i < 3-N; i++)
    {
      r.virtual_group_grid[i] = 1;
    }
    for(int i = 3-N; i < 3; i++)
    {
      r.virtual_group_grid[i]=div_ceil(g[N-3+i],thread_group_extents[i]);
    }
    if (max(r.virtual_group_grid) < MaxGroupsInDim)
    {
      double wastage_metric =
        (double(r.virtual_group_grid[0])*
        double(r.virtual_group_grid[1])*
        double(r.virtual_group_grid[2])*
        double(thread_group_extents.total_elements( )))/
        double(g.total_elements( ));
      if (wastage_metric > TooWasteful)
        goto load_balance;
      r.physical_group_grid = r.virtual_group_grid;
      r.dispatch_mode = N;
      return;
    }
    // The case here tries to map one dimension directly into Gx and
    // spread the remaining two across Gy and Gz.
    if (N==3)
    {
      for (int disp=4; disp<=6; disp++)
      {
        int dims[3]; // permutation set for the dimensions
        // Prefer to preserve dimension #2 ("x" dimension),
        // so try case '4' first
        switch (disp) {
        case 4: dims[DimZ]=DimZ; dims[DimY]=DimY; dims[DimX]=DimX; break;
        case 5: dims[DimZ]=DimZ; dims[DimY]=DimX; dims[DimX]=DimY; break;
        case 6: dims[DimZ]=DimY; dims[DimY]=DimX; dims[DimX]=DimZ; break;
        }
        __int64 _3rd_dim_groups = r.virtual_group_grid[dims[DimX]];
        if (_3rd_dim_groups < MaxGroupsInDim)
        {
          __int64 required_groups =
            div_ceil(g.total_elements( ), thread_group_extents.total_elements( ));
          __int64 _2d_leftover =
```

Pseudocode 39

```
        r.virtual_group_grid[dims[DimZ]] * r.virtual_groupds_grid[dims[DimY]];
      __int64 __2d_extent =
        __int64(ceil(pow(double(__2d_leftover), double(0.5))));
      if (__2d_extent < MaxGroupsInDim)
      {
        r.physical_group_grid[0] = int(__2d_extent);
        r.physical_group_grid[1] = int(div_ceil(__2d_leftover, __2d_extent));
        r.physical_group_grid[2] = int(__3rd_dim_groups);
        double wastage_metric =
          (double(r.Gz)*double(r.Gy)*double(r.Gx)*
            double(thread_group_extents.total_elements( ))) /
            double(g.total_elements( ));
        if (wastage_metric > TooWasteful)
          goto load_balance;
        r.dispatch_mode = disp;
        return;
      }
    }
   }
  }
 }
}
load_balance:
// Here, either N>3 or there are more than two logical dimensions we need
// to spread.
  __int64 required_groups =
    div_ceil(g.total_elements( ), thread_group_extents.total_elements( ));
  __int64 __3d_extent =
    __int64(ceil(pow(double(required_groups), double(1)/double(3))));
  __int64 x = min(__3d_extent, __int64(MaxGroupsInDim−1));
  __int64 __2d_leftover = div_ceil(required_groups, x);
  __int64 __2d_extent =
    __int64 (ceil(pow(double(2d_leftover), double(1)/double(2))));
  __int64 y = min(__2d_extent, __int64(MaxGroupsInDim−1));
  __int64 z = div_ceil(__2d_leftover, y);
  if (z >= MaxGroupsInDim)
    throw NULL;
  r.physical_group_grid[0] = int(z);
  r.physical_group_grid[1] = int(y);
  r.physical_group_grid[2] = int(x);
  r.dispatch_mode = 7;
}
```

Index code-gen: Given physical_thread_info (which is just another rendition of the gid/gtid/dtid information), based on the dispatch_mode passed in at runtime, different index calculation code is generated.

Pseudocode 40

```
template <int N>
bool calculate_logical_index(
    const extents<N>& g,
    const physical_dispatch_info& r,
    const physical_thread_info& th,
    index<N>& logical_idx
)
{
  // Note that the code below contains some dead code based on the value of the
  // compile time constants N and dispatch mode. The compiler will eliminate
  // code below accordingly. We present the code in this redundant form for
  // completeness.
  int dispatch_mode = r.dispatch_mode;
  // Direct mapping
  if (dispatch_mode >=1 && dispatch_mode <= 3)
  {
    //assert(dispatch_mode == N);
    for (int i=0; i<N; i++)
    {
      logical_idx[i] = th.global_id[3−N+i];
    }
    return g.within_boundaries(logical_idx);
  }
  // Partially direct mapping
```

Pseudocode 40

```
if (dispatch mode >= 4 && dispatch_mode <= 6)
{
  size_t yz_group_offset =
    r.physical_group_grid[1]*th.group_id[DimZ] + th.group_id[DimY];
  extents<2>
    yz_group_grid(r.virtual_group_grid[DimZ], r.virtual_group_grid[DimY]);
  index<2> yz_group_id =
    raise<2>(yz_group_offset, yz_group_grid);
  index<3> xyz_group_id =
    index<3>(yz_group_id[DimZ], yz_group_id[DimY], th.group_id[DimX]);
  // Reorder xyz_group such that we recover original order of the logical
  // thread group we placed there in the stub.
  int dims[3]; // permutation set for the dimensions
  switch (dispatch_mode) {
  // Reverse map
  // case 4: dims[DimZ]=DimZ; dims[DimY]=DimY; dims[DimX]=DimX; break;
    case 4: dims[DimZ]=DimZ; dims[DimY]=DimY; dims[DimX]=DimX; break;
  // Reverse map
  // case 5: dims[DimZ]=DimZ; dims[DimY]=DimX; dims[DimX]=DimY; break;
    case 5: dims[DimZ]=DimZ; dims[DimY]=DimX; dims[DimX]=DimY; break;
  // Reverse map
  // case 6: dims[DimZ]=DimY; dims[DimY]=DimX; dims[DimX]=DimZ; break;
    case 6: dims[DimZ]=DimX; dims[DimY]=DimZ; dims[DimX]=DimY; break;
  }
  xyz_group_id =
    index<3>(  xyz_group_id[dims[DimZ]],
               xyz_group_id[dims[DimY]],
               xyz_group_id[dims[DimX]]);
  index<3> xyz_logical_idx;
  xyz_logical_idx[0] = xyz_group_id[0] * thread_group_extents[0] + th.local_id[0];
  xyz_logical_idx[1] = xyz_group_id[1] * thread_group_extents[1] + th.local_id[1];
  xyz_logical_idx[2] = xyz_group_id[2] * thread_group_extents[2] + th.local_id[2];
  // Make the compiler happy, in reality N = 3 so the below is a no-op
  logical_idx = xyz_logical_idx.extend<N>(0);
  return g.within_boundaries(logical_idx);
}
// Indirect mapping (dispatch_mode == 7)
extents<3> physical_grid = r.physical_group_grid * thread_group_extents;
__int64 global_offset = flatten<3>(th.global_id, physical_grid);
if (global_offset >= g.total_elements( ))
  return false;
logical_idx = raise<N>(global_offset, g);
return true;
}
```

To improve the performance further (avoid the cost of if/else in the stub), multiple versions of the stub function may be generated, one for each dispatch_mode, and at runtime pick the version corresponding to the dispatch_mode picked by the dispatch algorithm. It is also possible to generate one general version of the stub and a few more specific ones (i.e. a mixture of both options).

Again, if one wants to accommodate the case that the total number of points in the logical compute domain is greater than or equal to (MAX_GROUPS-1)^3, we can use multiple kernel invocation for that case.

Approach 5: Use a Grid as the Intermediate Embedding Domain for Generalized Compute Domains With this approach, all compute domain types are required to define these two members:

1. extents<K> get_intermediate_grid( ). This simultaneously declares the rank of the intermediate embedding grid the compute domain type would wish to use, through the value of K, which can be 1 for linear embedding, and it provides the runtime with information about the extents of the intermediate embedding grid.

2. bool map_intermediate_to_logical(index<K> intermediate_idx, index<N>& idx). This function provides the reverse mapping from any point in the intermediate embedding grid, back to a logical ID, with optional filtering. i.e., if a point in the embedding grid does not have a reservedly mapping logical index returned to it, the function returns false.

For a given K, the rank of the embedding grid, the corresponding embedding grid of rank K, can be used in conjunction with any of the previous algorithms, which map between logical grids and physical grids. Instead, to carry out the dispatch, we would first ask the type to furnish its intermediate embedding grid, then one would dispatch using the supplied grid as was described in the previous algorithms. Then, at the stub, one would use any of the previous approaches to reconstruct the intermediate embedding grid index, and one would use the type provided function map_intermediate_to_logical to map from the intermediate index to a logical index. If the point is not filtered, the user provided kernel function is then invoked with the given logical index value.

Approach 6: Scheduling for Thread-Grouped Compute Domains

This approach involves the physical scheduling of thread-grouped computed domains. This is an adaptation of approach #5 with the following changes:

1. Groups may not be "partial", either all threads in a group execute the kernel, or none do. As was explained before, this type of divergence defeats the purpose of thread grouping.

2. The extents of the intermediate compute grid specified are divisible by the extents of the thread grouped specified. If they are not, an error is reported.
3. Some tests for boundary conditions and rounding of divisions become unnecessary due to #2 above.

In the code below, the term "logical" refers to the intermediate grid, which from the scheduler's point of view, is a stand-in for the logical grid. This is just a syntactical convention, which is prompted by the desire to reuse the terms introduced earlier, but it should be understood that the input to this stage is an intermediate grid.

Dispatch code:

---
Pseudocode 41
---

```
template<size_t N>
void determine_blocked_dispatch_dims(
    const extents<N>& g,
    const extents<N>& thread_group_extents,
    physical_dispatch_info& r
)
{
    C_ASSERT(N>0);
    // Validate input
    for (int i=0; i<N; i++)
    {
        if (g[i] <= 0) throw NULL;
        if (thread_group_extents[3-N+i] <= 0) throw NULL;
        if ((g[i] % thread_group_extents[3-N+i] ) != 0) throw NULL;
    }
    // Validate capacity
    __int64 max_possible_groups = __int64(MaxGroupsInDim-1) *
__int64(MaxGroupsInDim-1) * __int64(MaxGroupsInDim-1);
    __int64 required_groups = g.total_elements( ) /
thread_group_extents.total_elements( );
    if (required_groups > max_possible_groups) throw NULL;
    r.dispatch_mode = 0; // undetermined initially
    if (N <= 3)
    {
        for(int i = 0; i < 3-N; i++)
        {
            r.virtual_group_grid[i] = 1;
        }
        for(int i = 3-N; i < 3; i++)
        {
            r.virtual_group_grid[i] = div_ceil(g[N-3+i],
thread_group_extents[i]);
        }
        if (max(r.virtual_group_grid) < MaxGroupsInDim)
        {
            double wastage_metric =
                (double(r.virtual_group_grid[0])*
                 double(r.virtual_group_grid[1])*
                 double(r.virtual_group_grid[2])*
                 double(thread_group_extents.total_elements( )))
/ double(g.total_elements( ));
            if (wastage_metric > TooWasteful)
                goto load_balance;
            r.physical_group_grid = r.virtual_group_grid;
            r.dispatch_mode = N;
            return;
        }
        // The case here tries to map one dimension directly
into Gx and
        // spread the remaining two across Gy and Gz.
        if (N==3)
        {
            for (int disp=4; disp<=6; disp++)
            {
                int dims[3]; // permutation set for the dimensions
                // Prefer to preserve dimension #2 ("x" dimension), so try case '4' first
                switch (disp) {
                    case 4: dims[DimZ]=DimZ; dims[DimY]=DimY; dims[DimX]=DimX; break;
                    case 5: dims[DimZ]=DimZ; dims[DimY]=DimX; dims[DimX]=DimY; break;
                    case 6: dims[DimZ]=DimY; dims[DimY]=DimX; dims[DimX]=DimZ; break;
                }
                __int64 __3rd_dim_groups =
```

Pseudocode 41

```
        r.virtual_group_grid[dims[DimX]];
                    if (_3rd_dim_groups < MaxGroupsInDim)
                    {
                        __int64 __2d_leftover =
                            r.virtual_group_grid[dims[DimZ]] *
r.virtual_group_grid[dims[DimY]];
                        __int64 __2d_extent =
    __int64(ceil(pow(double(__2d_leftover), double(0.5))));
                        if (__2d_extent < MaxGroupsInDim)
                        {
                            r.physical_group_grid[0] =
int(__2d_extent);
                            r.physical_group_grid[1] =
int(div_ceil(__2d_leftover, __2d_extent));
                            r.physical_group_grid[2] =
    int(__3rd_dim_groups);
                            r.dispatch_mode = disp;
                            return;
                        }
                    }
                }
            }
        }
    // Here, either N>3 or some spreading is needed
        __int64  x   =   __int64(ceil(pow(double(required_groups),
double(1)/double(3))));
        __int64 __2d_leftover = div_ceil(required_groups, x);
        __int64  y  =   __int64(ceil(pow(double(__2d_leftover),
double(1)/double(2))));
        __int64 z = div_ceil(__2d_leftover, y);
        if (max(x,max(y,z)) >= MaxGroupsInDim)
            throw NULL;
        r.physical_group_grid[0] = int(z);
        r.physical_group_grid[1] = int(y);
        r.physical_group_grid[2] = int(x);
        r.dispatch_mode = 7;
}
```

Stub code follows below. In the below code, some data is shown as being passed in as parameters, whereas in reality, those parameters will be resolved into constants which will allow more efficient code generation. In particular, the thread_group_extents and the dispatch_mode, will in most cases be "scorched" into the binary code.

Pseudocode 42

```
template <int N>
bool calculate_blocked_logical_index(
    const extents<N>& g,
    const extents<N>& thread_group_extents,
    const physical_dispatch_info& r,
    const physical_thread_info& th,
    index<N>& logical_global_idx,
    index<N>& logical_group_idx,
    index<N>& logical_local_idx
)
{
    // Note that the code below contains some dead code based on the value of the
    // compile time constants N and dispatch mode. The compiler will eliminate code
    // below accordingly. We present the code in this redundant form for completeness.
    int dispatch_mode = r.dispatch_mode;
    // Direct mapping
    if (dispatch_mode >=1 && dispatch_mode <= 3)
    {
        //assert(dispatch_mode == N);
        for (int i=0; i<N; i++)
        {
            logical_global_idx[i] = th.global_id[3-N+i];
            logical_group_idx[i]  = th.group_id[3-N+i];
            logical_local_idx[i]  = th.local_id[3-N+i];
        }
    // assert(g.within_boundaries(logical_idx));
```

---
Pseudocode 42
---

```
        return true;
    }
    // Partially direct mapping (N=3)
    if (dispatch_mode >= 4 && dispatch_mode <= 6)
    {
        size_t yz_group_offset =
r.physical_group_grid[1]*th.group_id[DimZ] + th.group_id[DimY];
        extents<2>       yz_group_grid(r.virtual_group_grid[DimZ],
r.virtual_group_grid[DimY]);
        index<2> yz_group_id = raise<2>(yz_group_offset,
yz_group_grid);
        index<3> xyz_group_id = index<3>(yz_group_id[DimZ],
yz_group_id[DimY], th.group_id[DimX]);
        // Reorder xyz_group such that we recover original
order of the
        // logical thread group we placed there in the stub.
        int dims [3]; // permutation set for the dimensions
        switch (dispatch_mode) {
            // Reverse map case 4: dims[DimZ]=DimZ;
dims[DimY]=DimY; dims[DimX]=DimX; break;
            case 4: dims[DimZ]=DimZ; dims[DimY]=DimY;
dims[DimX]=DimX; break;
            // Reverse map case 5: dims[DimZ]=DimZ;
dims[DimY]=DimY; dims[DimX]=DimY; break;
            case 5: dims[DimZ]=DimZ; dims[DimY]=DimX;
dims[DimX]=DimY; break;
            // Reverse case 6: map dims[DimZ]=DimY;
dims[DimY]=DimX; dims[DimX]=DimZ
            case 6: dims[DimZ]=DimX; dims[DimY]=DimZ;
dims[DimX]=DimY; break;
        }
        xyz_group_id = index<3>( xyz_group_id[dims[DimZ]],
xyz_group_id[dims[DimY]], xyz_group_id[dims[DimX]]);
        // Filter (uniform over groups)
        if
(!r.virtual_group_grid.within_boundaries(xyz_group_id))
            return false;
        // Generate global and local ID's
        index<3> xyz_logical_idx;
        xyz_logical_idx[0] = xyz_group_id[0] *
thread_group_extents[0] + th.local_id[0];
        xyz_logical_idx[1] = xyz_group_id[1] *
thread_group_extents[1] + th.local_id[1];
        xyz_logical_idx[2] = xyz_group_id[2] *
thread_group_extents[2] + th.local_id[2];
        // Make the compiler happy, in reality N = 3 so the
below is a no-op
        logical_global_idx = xyz_logical_idx.extend<N>(0);
        logical_group_idx = xyz_group_id.extend<N>(0);
        logical_local_idx = th.local_id.extend<N>(0);
        return g.within_boundaries(logical_global_idx);
    }
    // Indirect mapping (dispatch_mode == 7)
    __int64 group_offset = flatten<3>(th.group_id,
r.physical_group_grid);
    // Filter uniformly on groups
    if (group_offset >= r.virtual_group_grid.total_elements( ))
        return false;
    logical_group_idx = raise<N>(group_offset,
r.virtual_group_grid);
    logical_global_idx = logical_group_idx *
thread_group_extents + th.local_id;
    logical_local_idx = th.local_id;
    return true;
}
```

Example Processes

FIGS. 2-5 are flow diagrams illustrating example processes 200, 300, 400 and 500 that implement the techniques described herein. The discussion of these processes will include references to computer components of FIG. 1. Each of these processes is illustrated as a collection of blocks in a logical flow graph, which represents a sequence of operations that can be implemented in hardware, software, firmware, or a combination thereof. In the context of software, the blocks represent computer instructions stored on one or more computer-readable storage media that, when executed by one or more processors of such a computer, perform the recited operations. Note that the order in which the processes are described is not intended to be construed as a limitation, and any number of the described process blocks can be combined in any order to implement the processes, or an alternate process. Additionally, individual blocks may be deleted from the processes without departing from the spirit and scope of the subject matter described herein.

Figure 2:
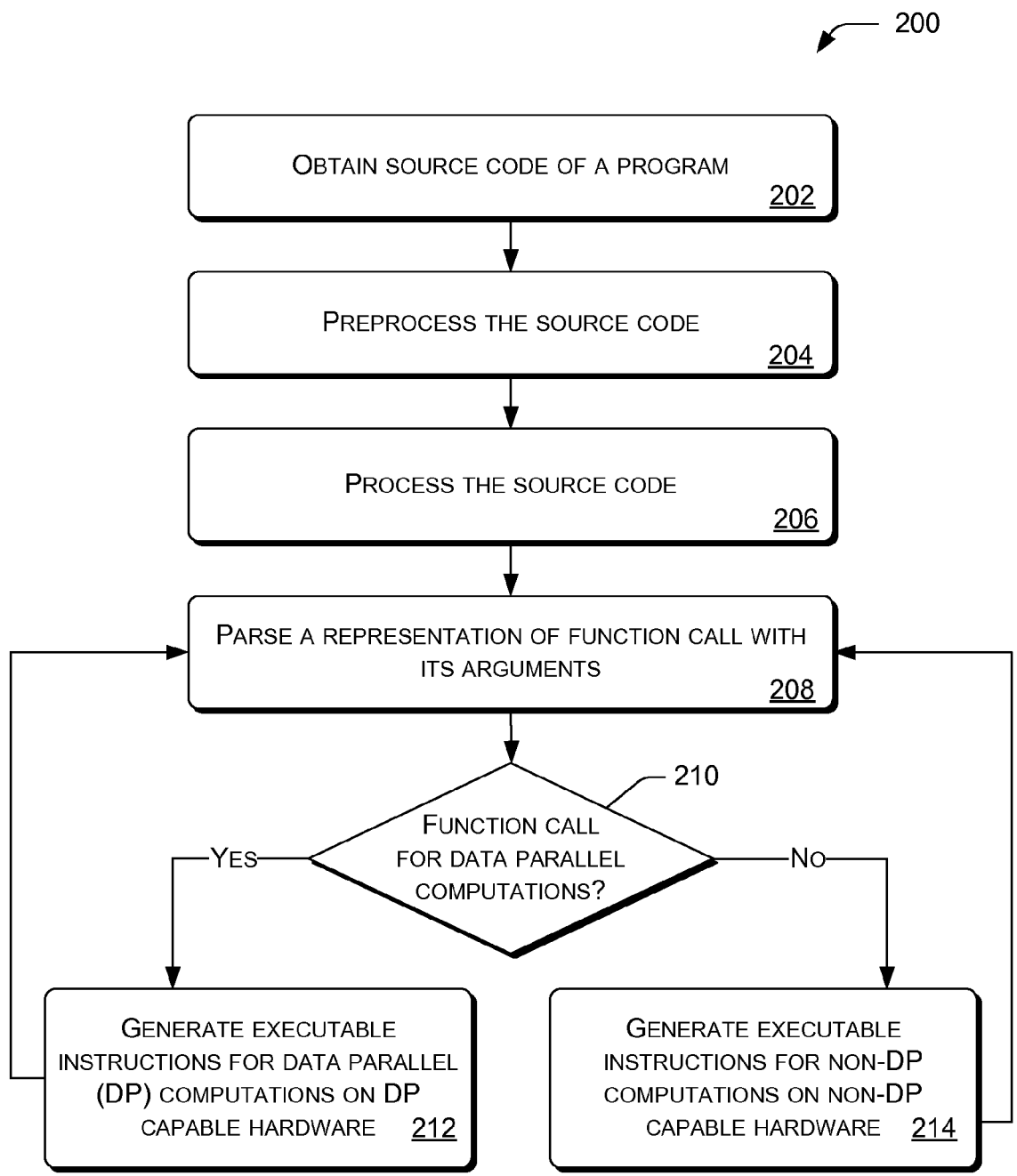
FIGS. 2 and 3 are flow diagrams of one or more example processes, each of which implements some of the techniques described herein, especially those related to a data parallel programming model.

FIG. 2 illustrates the example process 200 that facilitates production of programs that are capable of executing on DP capable hardware. That production may be, for example, performed by a C++ programming language compiler. The process 200 is performed, at least in part, by a computing device or system which includes, for example, the computing device 102 of FIG. 1. The computing device or system is configured to facilitate the production of one or more DP executable programs. The computing device or system may be either non-DP capable or DP capable. The computing device or system so configured qualifies as a particular machine or apparatus.

As shown here, the process 200 begins with operation 202, where the computing device obtains a source code of a program. This source code is a collection of textual statements or declarations written in some human-readable computer programming language (e.g., C++). The source code may be obtained from one or more files stored in a secondary storage system, such as storage system 106.

For this example process 200, the obtained source code includes a textual representation of a call for a DP call-site. The textual representation includes indicators of arguments that are associated with the call for the DP call-site. The function calls from pseudocode listings 8-11 above are examples of a type of the textual representation contemplated here. In particular, the forall, scan, reduce, and sort function calls and their argument of those listings are example textual representations. Of course, other formats of textual representations of function calls and arguments are contemplated as well.

At operation 204, the computing device preprocesses the source code. When compiled, the preprocessing may include a lexical and syntax analysis of the source code. Within the context of the programming language of the compiler, the preprocessing verifies the meaning of the various words, numbers, and symbols, and their conformance with the programming rules or structure. Also, the source code may be converted into an intermediate format, where the textual content is represented in an object or token fashion. This intermediate format may rearrange the content into a tree structure. For this example process 200, instead of using a textual representation of the call for a DP call-site function (with its arguments), the DP call-site function call (with its arguments) may be represented in the intermediate format.

At operation 206, the computing device processes the source code. When compiled, the source-code processing converts source code (or an intermediate format of the source code) into executable instructions.

At operation 208, the computing device parses each representation of a function call (with its arguments) as it processes the source code (in its native or intermediate format).

At operation 210, the computing device determines whether a parsed representation of a function call is a call for a DP computation. The example process 200 moves to operation 212 if the parsed representation of a function call is a call for a DP computation. Otherwise, the example process 200 moves to operation 214. After generating the appropriate executable instructions at either operation 212 or 214, the example process returns to operation 208 until all of the source code has been processed.

At operation 212, the computing device generates executable instructions for DP computations on DP capable hardware (e.g., the DP compute engine 120). The generated DP executable instructions include those based upon the call for the DP call-site function with its associated arguments. Those DP call-site function instructions are created to be executed on a specific target DP capable hardware (e.g., the DP compute engine 120). In addition, when those DP-function instructions are executed, a data set is defined based upon the arguments, with that data set being stored in a memory (e.g., node memory 138) that is part of the DP capable hardware. Moreover, when those DP-function instructions are executed, the DP call-site function is performed upon that data set stored in the DP capable memory.

At operation 214, the computing device generates executable instructions for non-DP computations on non-DP capable hardware (e.g., the non-DP host 110).

After the processing, or as part of the processing, the computing device links the generated code and combines it with other already compiled modules and/or run-time libraries to produce a final executable file or image.

Figure 3:
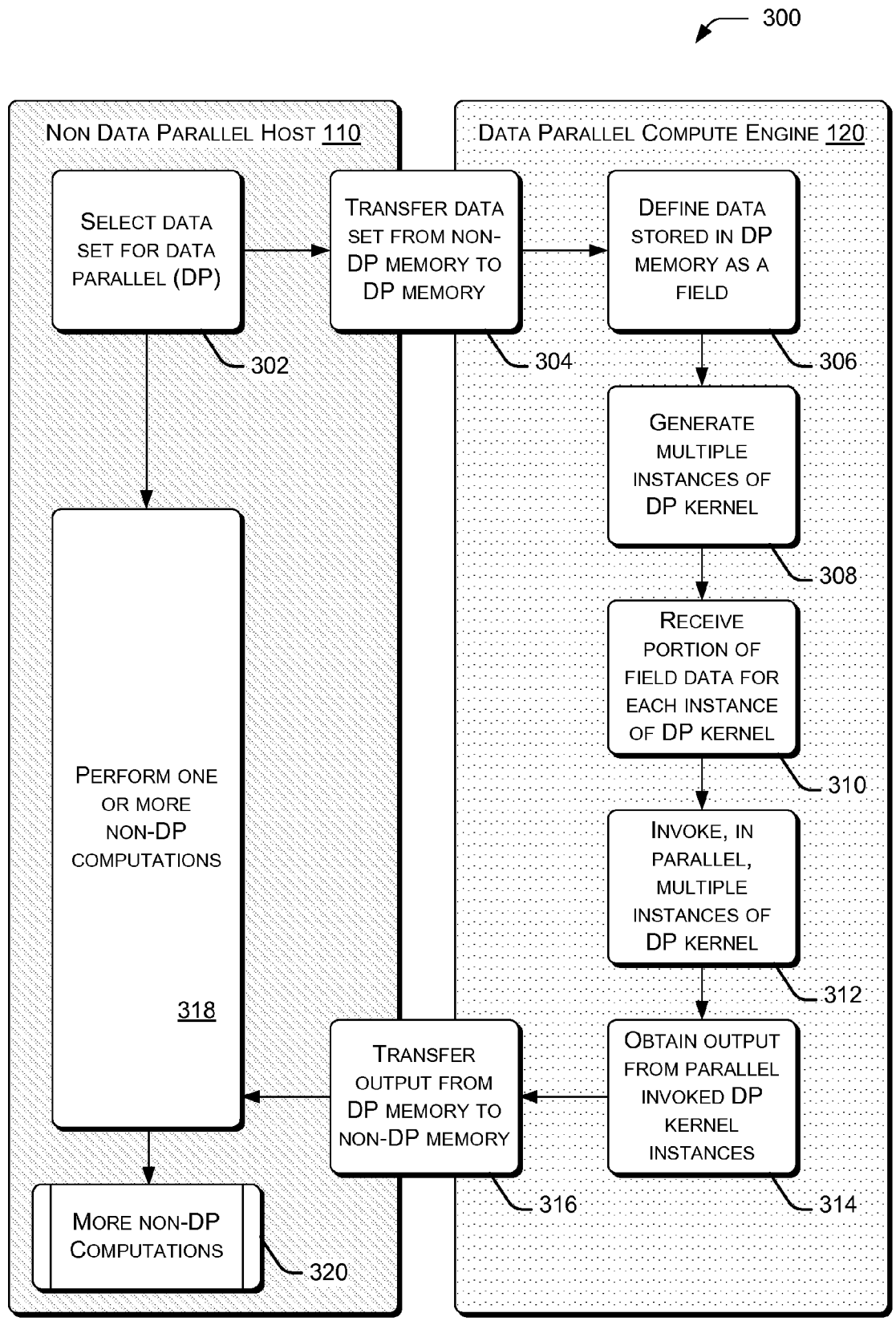

FIG. 3 illustrates the example process 300 that facilitates the execution of DP executable programs in DP capable hardware. The process 300 is performed, at least in part, by a computing device or system which includes, for example, the computing device 102 of FIG. 1. The computing device or system is configured to execute instructions on both non-DP capable hardware (e.g., the non-DP host 110) and DP capable hardware (e.g., the DP compute engine 120). Indeed, the operations are illustrated with the appropriate hardware (e.g., the non-DP host 110 and/or the compute engine 120) that executes the operations and/or is the object of the operations. The computing device or system so configured qualifies as a particular machine or apparatus.

As shown here, the process 300 begins with operation 302, where the computing device selects a data set to be used for DP computation. More particularly, the non-DP capable hardware (e.g., non-DP host 110) of the computing device selects the data set that is stored in a memory (e.g., the main memory 114) that is not part of the DP capable hardware of one or more of the computing devices (e.g., computing device 102).

At operation 304, the computing device transfers the data of the selected data set from the non-DP memory (e.g., main memory 114) to the DP memory (e.g., the node memory 128). In some embodiments, the host 110 and DP compute engine 120 may share a common memory system. In those embodiments, authority or control over the data is transferred from the host to the computer engine. Or the compute engine obtains shared control of the data in memory. For such embodiments, the discussion of the transferred data herein implies that the DP compute engine has control over the data rather than the data has been moved from one memory to another.

At operation 306, the DP-capable hardware of the computing device defines the transferred data of the data set as a field. The field defines the logical arrangement of the data set as it is stored in the DP capable memory (e.g., node memory 138). The arguments of the DP call-site function call define the parameters of the field. Those parameters may include the rank (i.e., number of dimensions) of the data set and the data type of each element of the data set. The index and compute domain are other parameters that influence the definition of the field. These parameters may help define the shape of the processing of the field. When there is an exact type match then it is just an ordinary argument passing, but there may be projection or partial projection.

At operation 308, the DP capable hardware of the computing device prepares a DP kernel to be executed by multiple data parallel threads. The DP kernel is a basic iterative DP activity performed on a portion of the data set. Each instance of the DP kernel is an identical DP task. The particular DP task may be specified by the programmer when programming the DP kernel. The multiple processing elements (e.g., elements 140-146) represent each DP kernel instance.

At operation 310, each instance of the DP kernel running as part of the DP capable hardware of the computing device receives, as input, a portion of the data from the field. As is the nature of data parallelism, each instance of a DP kernel operates on different portions of the data set (as defined by the field). Therefore, each instance receives its own portion of the data set as input.

At operation 312, the DP capable hardware of the computing device invokes, in parallel, the multiple instances of the DP kernel in the DP capable hardware. With everything properly setup by the previous operations, the actual data parallel computations are performed at operation 312.

At operation 314, the DP capable hardware of the computing device gets output resulting from the invoked multiple instances of the DP kernel, the resulting output being stored in the DP capable memory. At least initially, the outputs from the execution of the DP kernel instances are gathered and stored in local DP capable memory (e.g., the node memory 128).

At operation 316, the computing device transfers the resulting output from the DP capable memory to the non-DP capable memory. Of course, if the memory is shared by the host and compute engine, then only control or authority need be transferred rather than the data itself. Once all of the outputs from the DP kernel instances are gathered and stored, the collective outputs are moved back to the non-DP host 110 from the DP compute engine 120.

Operation 318 represents the non-DP capable hardware of the computing device performing one or more non-DP computations and doing so concurrently with parallel invocation of the multiple instances of the DP kernel (operation 312). These non-DP computations may be performed concurrently with other DP computations as well, such as those of operations 306, 308, 310, and 314. Moreover, these non-DP computations may be performed concurrently with other transfers of data between non-DP and DP memories, such as those of operations 304 and 316.

The return transfer of outputs, shown as part of operation 316, is asynchronous to the calling program. That is, the program (e.g., program 118) that initiates the DP call-site function need not wait for the results of the DP call-site. Rather, the program may continue to perform other non-DP activity. The actual return transfer of output is the synchronization point.

At operation 320, the computing device continues as normal, performing one or more non-DP computations.

Figure 4:
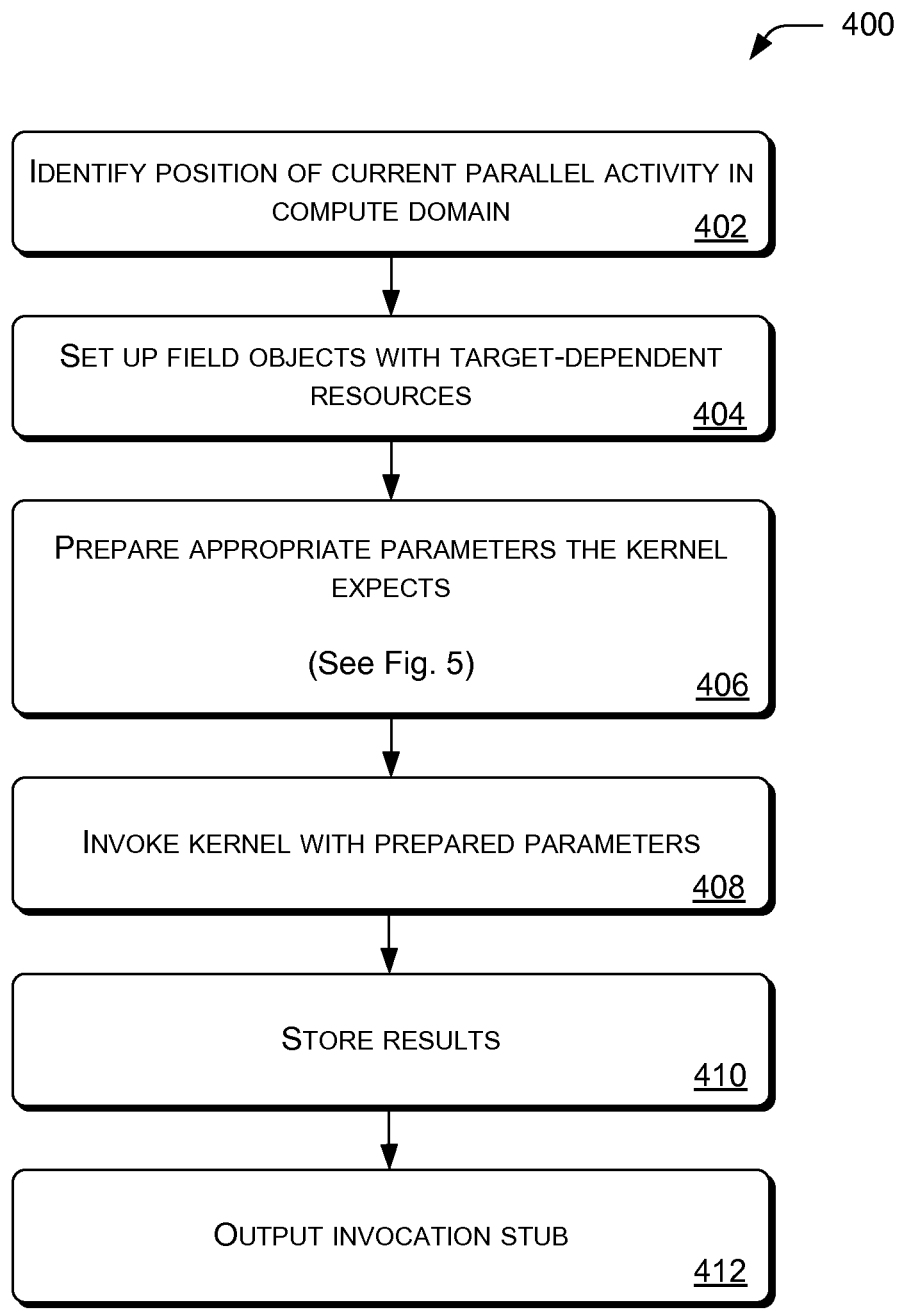
FIGS. 4 and 5 are flow diagrams of one or more example processes, each of which implements the techniques described herein, including those related to the compiler-generated invocation stubs for the data parallel programming model.

FIG. 4 illustrates the example process 400 that facilitates production of a DP invocation stub for at least one DP function. That stub production may be, for example, performed by a C++ programming language compiler, such as compiler 116. The process 400 is performed, at least in part, by a computing device or system which includes, for example, the computing device 102 of FIG. 1. The computing device or system is configured to facilitate the production of one or more DP invocation stubs. The computing device or system may be either non-DP capable or DP capable. The computing device or system so configured qualifies as a particular machine or apparatus.

For this description of the process 400, the following example source-code pseudocode is referenced for the purposes of illustration:

---

Pseudocode 43

__declspec(vector) void foo(index<2> cIdx, float & c, read_only<field<2, float>> mA, read_only<field<2, float>> mB, int n);
   grid<2> gA(rv, M, W), gB(rv, W, N), gC(rv, M, N);
   field<2, float> mA(gA), mB(gB), mC(gC);
...
   forall(mC.get_grid( ), foo, mC, mA, mB, 5);

---

As shown here, the process 400 begins with operation 402, where the computing device identifies the position of the current parallel activity in the compute domain. This is done based upon the target-dependent compute unit identity (e.g., the thread index in a GPU six-dimension thread deployment model). In other words, the computing device identifies the physical location in the target DP-capable hardware (e.g., the compute engine 120) where data parallel activity is occurring for the designated compute domain.

Also, at operation 402, the computing device chooses a thread deployment strategy, and generates corresponding index mapping code in the invocation stub that identifies (e.g., maps) the position of the current parallel activity in the compute domain based upon the target-dependent compute unit identity (which is available at runtime, not accessible to the compiler). Here, the computing device also generates a declaration of an entry function header since what to declare in the header depends on the thread-deployment decision.

This operation may include an examination of the arguments of the DP function, such as forall; generating a declaration of an entry function header and declarations of target-dependent resources in the invocation stub; and a mapping of the DP hardware thread position to the logical parallel activity position in the compute domain.

To elaborate further, as part of operation 402, the computing device examines the arguments of the DP function, such as forall. The computing device determines the number and type of target buffers needed, and then declares them in the invocation stub. Based upon the example given in pseudocode 14 above, there are three field type arguments in the forall invocation, and thus, three device buffer bindings are needed.

Each field instance corresponds to a target buffer binding variable. However, a field may be contained in another data structure. Therefore, a deep traversal of each DP-function argument is performed in order to identify all of the field instances. The computing device determines the writability of each field instance transitively contained by the argument list in order to define the specific type of target buffer binding in an intermediate code used for the invocation stub. Once all information is collected, a list of buffer bindings is declared for the stub.

The kind of buffer binding variables to use is also determined. If the stub is in HLSL, for example, HLSL has many kinds of buffer binding types (e.g., ByteAddrressBuffer, StructuredBuffer, etc.). The StructuredBuffer<T> may be used to represent the device buffer binding of a field<N, T>.

In some implementations, like that in HLSL, the buffer binding types are divided into two categories: read-only or writable. StructuredBuffer<T> is read-only and RWStructuredBuffer<T> is writable. At least one implementation uses the "constness" of the kernel parameter type to determine whether a given function's argument is writable or not. Another implementation uses a special type read_only<T> to assert the read-only usage so that the compiler can map that to a read-only buffer binding.

Based upon the example from pseudocode 19 above, this is part of the invocation stub created thus far:

Pseudocode 44

```
////////////////////////////////////////////////////
RWStructuredBuffer<float> gB1   : register(u0);
StructuredBuffer<float> gB2     : register(t0);
StructuredBuffer<float> gB3     : register(t1);
////////////////////////////////////////////////////
```

Also, a constant buffer is declared. The constant buffer is used to transfer all necessary data from non-DP host 110 to the DP compute engine 120 that is not part of the field's data set. In other words, all other non-field data in the argument list of the DP function is passed to the target via the constant buffer. The constant buffer may contain (by way of example and not limitation):

A field argument's shape information (e.g., extents, multiplier, offset);

Any non-field function argument (e.g., scalar argument) including the compute domain parameter; and The shader dispatch shape information (e.g., group dimension multiplier).

Based upon the example from pseudocode 19 above, the constant buffer declaration may look like this:

Pseudocode 45

```
////////////////////////////////////////////////////
cbuffer CB_PARAMS {
    _group_dims_mult cb_group_dims_mult;
    _grid_2 cb_compute_grid;
    _field_2_base cb_arg1;
    _field_2_base cb_arg2;
    _field_2_base cb_arg3;
    int cb_arg4;
};
////////////////////////////////////////////////////
```

Here, _grid_2 is the HLSL class for grid<2>, and _field_2_base is the HLSL class that corresponds to field<2, T>'s share information. Note that special index parameters cannot be transferred and are not transferred via the constant buffer. Instead, they are generated in the invocation stub.

Another implementation may include generating raw, non-typed data, and use appropriate offset to access data from originally typed data. In that case, the constant buffer looks like:

```
cbuffer CB_PARAMS {
    uint m1;
    unit m2;
    ...
}
```

In this case, no HLSL class will be generated.

Operation 402 may also include a declaration of the entry function header. This is a declaration of the invocation stub, in effect. This involves declaring a "numthread" attribute and declaring system variables, which may be useful to the invocation stub.

The "numthread" attribute specifies the shape of threads within a block. The numthread indicates how threads inside a thread group are deployed in multiple dimensions. For at least one implementation, the computing device generates "numthreads[256,1,1]" as a generic thread deployment for non-tiled cases. For the tiled cases, if the rank of tile is less or equal to three, the computing device uses the shape of tile in the "numthreads" attribute, if possible. Otherwise, the computing device distributes the dimensionality of tile to the 3-dimension physical thread group as efficiently as possible, or reports an error if the tile could not fit into the physical thread group.

Operation 402 may also include a mapping of the DP hardware's thread position to the logical parallel activity position in the compute domain.

The concept of the compute domain helps describe the parallelism of data parallel functions. This enables the programmers to think at a logical level, instead of a computational device level (i.e., hardware level), when deploying the parallel activities. For example, for a vector addition, the compute domain is the shape of the vector, that is, each element can be computed independently by a parallel activity. However, how these logical parallel activities should be mapped to the underlying DP hardware need not be part of the programmer's concern when using one or more implementations described herein.

However, each kind of DP hardware has its own way to deploy parallel computations. In some DP hardware, GPU threads are dispatched in a six-dimension model. With those, three dimensions are used to describe the deployment of thread blocks (or groups) and three dimensions are used to describe the shape of threads within a block (group). The invocation stub resulting from process 400 may map the DP hardware's thread position (e.g., a point in the six-dimension domain) to the logical parallel activity position in the compute domain.

One way to accomplish this mapping includes getting a linear thread identification ("ltid") among all threads in the same dispatch (this is called herein "transformation index flattening" or simply "flattening") and then mapping the linear thread identification back to an index in the compute domain (this is called herein "index raising" or simply "raising"). For a tiled deployment, the three-dimension thread group domain and the three-dimensional in-group domain may be mapped separately to the tile index and the local index, respectively, using the similar flattening and raising algorithm.

For example, there is a three-dimension domain with extents E0, E1, E2 (most significant to the least significant). For a given point (I0, I1, I2) in this domain, $$ltid = I0 * E1 * E2 + I1 * E2 + I2$$

Note that it is possible that the total number of parallel activities is smaller than the thread dimensionality within a group predefined by "numthreads" (e.g., 256 for the non-tiled cases). In that case, there will be some threads that should not execute the kernel since they are not part of the compute domain. To prevent these threads from doing work that is not supposed to be done, after the code that computes the linear thread identification, the compiler encloses the rest of the invocation stub inside a condition to make sure the threads that map to the compute domain will execute the kernel, but other threads do not.

The next step is to raise the ltid to an index of the compute domain. The following function does the raising in a grid<2> compute domain:

Pseudocode 46

```
__index_2 map_index(__grid_2 g, uint flat_index)
{
    __index_2 index;
    uint extent = g.get_size( );
    extent /= g.m_extents[0];
    index.m_values[0] = flat_index / extent;
    flat_index = flat_index % extent;
    index.m_values[1] = flat_index;
    return index;
}
```

For example, the code that does flattening and raising in the invocation stub for the non-tiling case may look like this:

Pseudocode 47

```
////////////////////////////////////////////////////
unit ltid = (Gid.z * cb_group_dims_mult.x_mult_y +
        Gid.y * cb_group_dims_mult.x +
        Gid.x) * 256
    + GTid.x;
    __index_2 compute_idx = map_index(cb_compute_grid, ltid);
////////////////////////////////////////////////////
```

Note that this flatten and then raise approach is the most general algorithm that does not depend on the form of a thread group shape or the compute domain shape. But the computation involved in this two-step mapping might be a concern for some applications. One optimization could be making a thread group shape match the compute domain shape, if possible.

This flatten-raise approach handles all kinds of mapping between a target thread model and a compute domain. To improve performance, a better execution plan can be deployed for certain special cases to match the target thread model with the compute domain partially or completely so that the target thread index can be used directly as an index of the compute domain. For these cases, the compiler will generate code somewhat differently to take advantage of such specialization.

At operation 404, the computing device sets up field objects for the DP function with target-dependent resources.

At operation 406, the computing device prepares the appropriate parameters that the kernel expects. This operation is elaborated on in the later discussion of FIG. 5.

At operation 408, the computing device produces code that will invoke the kernel with the prepared parameters.

At operation 410, the computing device stores the result back to the right location. When a projection is performed, this operation restores the results back to the buffers where projection to scalar occurred. For those writable parameters to which the projection to scalar happened, the computed results are written back to the appropriate slot of the original buffer.

At operation 412, the computing device outputs the invocation stub, such as those of stubs 118. The invocation stub may be stored, for example, to memory 114 and/or storage subsystem 106.

Furthermore, the computing device may generate additional code to set up the appropriate environment to start the DP computations. For example, an invocation stub in HLSL may include the following (by way of example and not limitation):

Define all kinds of buffers that will be used, e.g., structured buffers (writable or not), textures, constant buffers, etc.;

Declare an appropriate entry point function header including the numthreads attributes, and SV variables (SV variables are special physical thread indices that a DP compute device provides, including SV_GroupIndex, SV_DispathThreadId, SV_GroupThreadID, SV_GroupID)

Figure 5:
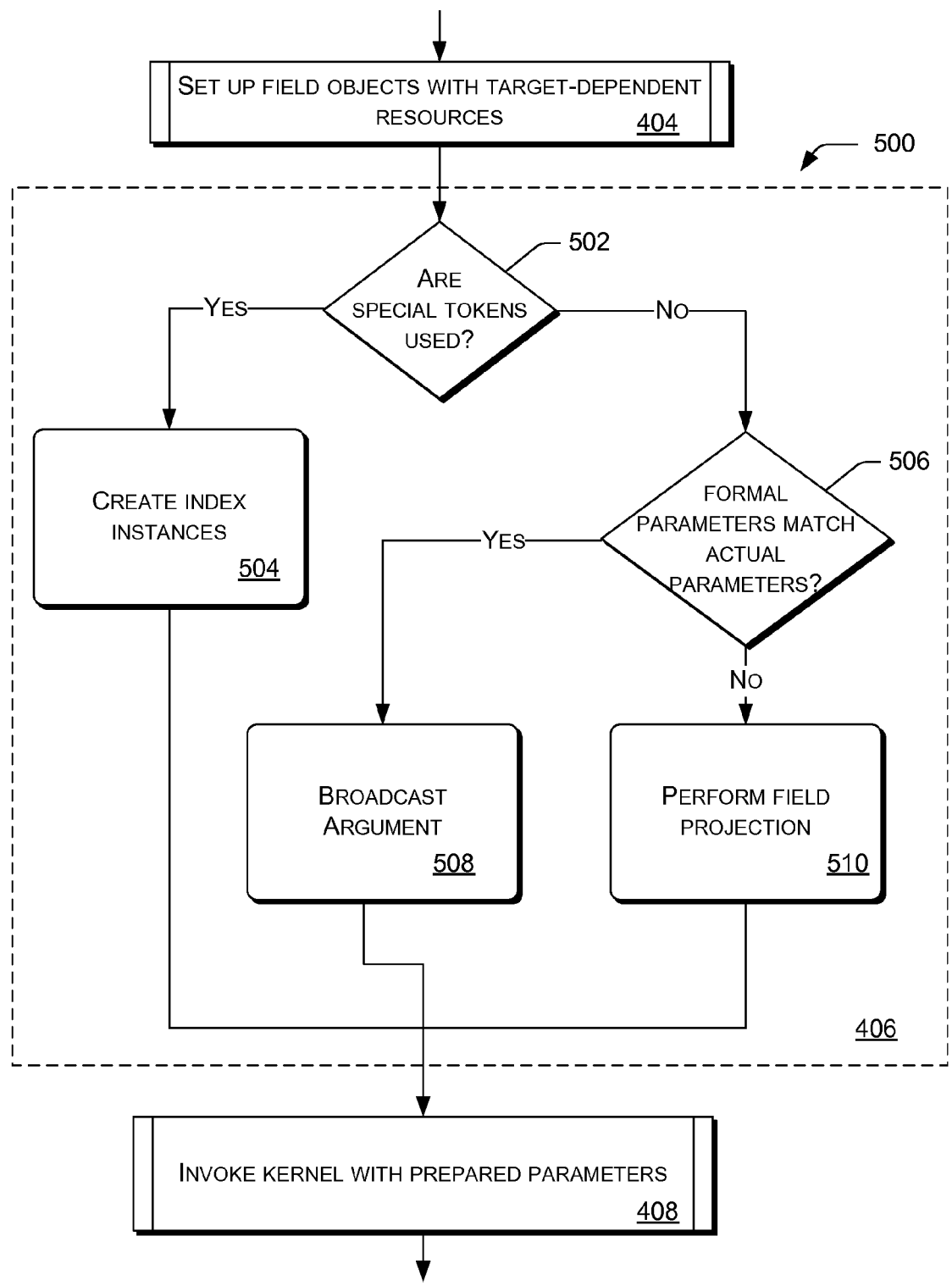

FIG. 5 illustrates the example process 500 that prepares the appropriate parameters that the kernel expects. The process 500 is performed, at least in part, by a computing device or system which includes, for example, the computing device 102 of FIG. 1. The computing device or system is configured to execute instructions on both non-DP capable hardware (e.g., the non-DP host 110) and DP-capable hardware (e.g., the DP compute engine 120). Indeed, the operations are illustrated with the appropriate hardware (e.g., the non-DP host 110 and/or the compute engine 120) that executes the operations and/or is the object of the operations. The computing device or system so configured qualifies as a particular machine or apparatus.

The process 500 is an expansion of operation 406 from FIG. 4. As shown here, the process 500 picks up after operation 404. At operation 502, the computing device determines if the kernel function's parameter corresponds to a special index, i.e., it identifies the parallel activity in the compute domain. If so, the process continues on to operation 504. If not, then the process proceeds to operation 506.

At operation 504, the computing device creates appropriate index instances when the special token (e.g., (_index, _tile_index, _local_index) is used as part of the DP function argument. If the special token is used, the programmer is specifying the mapping for a non-elemental kernel. After that, the process 500 is complete and process 400 picks up at operation 408. In addition, this process may iterate over the kernel function parameters one-by-one.

If no special index token is used, then the process 500 goes down the path via operation 506. As part of this operation, the computing device determines if the formal parameters match the actual parameters. If so, the process continues on to operation 508. If not, then the process proceeds to operation 510.

At operation 508, the computing device broadcasts the DP function's argument directly to the kernel. If the parameter is a broadcasting scalar ($R_a = R_f = 0$), then the value from the constant buffer is utilized by the kernel. If the parameter is a broadcasted field ($R_a = R_f > 0$), an instance of the appropriate field type is created and is initialized with the field's shape information passed via the constant buffer and the buffers defined as part of process 400. After operation 508, the process 500 is complete and process 400 picks up at operation 408.

If the formal parameters did not match the actual parameters, then the process goes down the path via operation 510. This means that the parameter involved a projection ($R_a = R_f + R_c$). As part of this operation, a field at rank $R_a$ is projected to a field at rank $R_f$ using the compute index computed as part of process 400. If $R_f$ is zero, then the element is loaded from the projected field to a scalar local variable. After operation 508, the process 500 is complete and process 400 picks up at operation 408.

Alternatively to process 500, the kernel function may be allowed to access the identity of the parallel activity in the compute domain, Instead of using special tokens, their functionality may be allowed implicitly. In this way, for example, if the kernel function has one more parameters than what are provided by the forall invocation, and the first parameter is in type index_group with the rank that is same as compute rank, the compiler may prepare the special index and pass it to the kernel function as its first parameter. Here a decision is made whether a given kernel function parameter should be mapped from the special indices, or the user provided data from forall invocation, and for latter, whether projection or broadcasting should be used.

Implementation Details

In one or more implementations, the compiler 116 performs code-generation of the kernel separately from the code-generation for the invocation stub. The invocation stub is not a customization of the kernel. Instead, the compiler 116 treats the kernel as a function to call and only requires the kernel's signature. This enables a more flexible compilation model, and reuse of the generated code of the kernel, but does not preclude the optimization opportunities if the body of the kernel is available.

Implementation of the inventive concepts described herein to the C++ programming language, in particular, may involve the use of a template syntax to express most concepts and to avoid extensions to the core language. That template syntax may include variadic templates, which are templates that take a variable number of arguments. A template is a feature of the C++ programming language that allows functions and classes to operate with generic types. That is, a function or class may work on many different data types without having to be rewritten for each one. Generic types enable raising data into the type system. This allows custom domain specific semantics to be checked at compile-time by a standards compliant C++ compiler. An appropriate compiler (e.g., compiler 116) may have accurate error messages and enforce some type of restrictions.

An instance of class index represents any N-dimensional index or N-dimensional extent. N is a compile-time constant, which is a parameter to the index template class. Alternatively, index may be separated from extent. Also, as part of the alternative, to avoid bound to the templates, all ranks may be specified at compile-time as a static constant member of the type. In a two-dimensional integer space, for example, a point in this space is typically labeled "<x,y> coordinate." For one or more implementations described herein, such a coordinate may be represented in a two-dimensional space as instances of the class index<2>. For a given instance idx of type index<2>, the "x" and "y" components are available using idx[0] and idx[1]. A programmer has a choice whether to equate "x" with idx[0] and "y" with idx[1], or the other way around. This decision is, most of the time, dictated by the physical layout of the data used for the index object and to index into.

An index can be initialized from an array or directly by passing the index values to the constructor. This is an example of pseudocode that may accomplish that:

| Pseudocode 48 |
|---|
| size_t extents[3] = {3, 7, 0}; |
| index<3> idx1(extents); |
| index<3> idx2(3, 7, 0); |

The above pseudocode would initialize a three-dimensional index where idx1 [0] equals 3, idx1 [1] equals 7, and idx 1[2] equals 0. In other words, the elements of the index are listed from lower index dimension to higher index dimension.

Indices support a number of useful operations. They can be copied and compared. The multiplication, addition, and subtraction operators may be applied to two index objects (of the same dimension) in a point-wise fashion. The dot-product of two indices (treating them like vectors) may be calculated. Index objects are lightweight and are typically passed by value and allocated on the stack.

The arguments of a DP call-site function call are used to define the parameters of the field upon which the DP call-site function will operate. In other words, the arguments help define the logical arrangement of the field-defined data set.

In addition to the rules about interpreting arguments for fields, there are other rules that may be applied to DP call-site functions in one or more implementations: Passing identical scalar values to invocation, and avoiding defining an evaluation order.

If an actual parameter is a scalar value, the corresponding formal may be restricted either to have non-reference type or to have a "const" attribute. With this restriction, the scalar is passed identically to all kernel invocations. This is a mechanism to parameterize a compute node based on scalars copied from the host environment at the point of invocation.

Within a DP kernel invocation, a field may be restricted to being associated with at most one non-const reference or aggregate formal. In that situation, if a field is associated with a non-const reference or aggregate formal, the field may not be referenced in any way other than the non-const reference or aggregate formal. This restriction avoids having to define an evaluation order. It also prevents dangerous aliasing and can be enforced as a side-effect of hazard detection. Further, this restriction enforces read-before-write semantics by treating the target of an assignment uniformly as an actual, non-const, non-elemental parameter to an elemental assignment function.

For at least one implementation, the kernel may be defined as an extension to the C++ programming language using the "_declspec" keyword, where an instance of a given type is to be stored with a domain-specific storage-class attribute. More specifically, "_declspec(vector)" is used to define the kernel extension to the C++ language.

A "map_index" maps between an offset in the range 0 to a grid's size minus one, and to an N dimensional index. The mapping between offsets and an N dimensional index assumes that idx[0] is most significant and that the last index dimension is least significant.

When storing N dimensional data in one-dimensional memory, varying the least significant index dimension results in references to memory locations which are adjacent, while varying the most significant index dimension results in memory references that are far apart. The following tables illustrate how a two-dimensional grid will be placed inside a one-dimensional memory. A tuple is of the form <idx[0],idx[1]>.

This is a logical view of a 3-by-4 two-dimensional grid:

| | | | |
|---|---|---|---|
| <0, 0> | <0, 1> | <0, 2> | <0, 3> |
| <1, 0> | <1, 1> | <1, 2> | <1, 3> |
| <2, 0> | <2, 1> | <2, 2> | <2, 3> |

And this is how the grid will be translated into flat index addresses:

| Flat Index | 0 | 1 | 2 | 3 | 4 | 5 | 6 | 7 | 8 | 9 | 10 | 11 | 12 |
|---|---|---|---|---|---|---|---|---|---|---|---|---|---|
| Grid Index | <0, 0> | <0, 1> | <0, 2> | <0, 3> | <1, 0> | <1, 1> | <1, 2> | <1, 3> | <1, 4> | <2, 0> | <2, 1> | <2, 2> | <2, 3> |

Usage example:

```
grid<2> cubic_domain(rv, 3, 4);
index<2> idx = cubic_domain.map_index(7);   // idx = <1,3>
```

Some of the parameters expected by the kernel function can be mapped (either via projection or broadcasting) directly from the user provided input data (arguments to forall invocations), some (e.g. the index, tile index, local index) depend on the thread dispatching decision, which do not have corresponding counter-part in the user provided input data. The implementations described herein provide a user with ways to refer to such special items in the kernel function.

Special index tokens are one approach for that purpose. It works as a marker in the forall argument list that let the compiler know that the corresponding parameter in the kernel function should be mapped to the special index obtained from the thread dispatching decision, not any user provided input data. Alternatively, instead of the special index tokens, in case the programmer wants to refer to such special index in their kernel function, the user is allowed to have one more parameter in the kernel parameter list than what are provided in the forall invocation site, and the first parameter may be the type for the special index they want. That is another way to let the compiler know that the first parameter of the kernel function should be mapped to the special index.

CONCLUDING NOTES

As used in this application, the terms "component," "module," "system," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of example, both an application running on a controller and the controller can be a component. One or more components may reside within a process and/or thread of execution, and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter.

An implementation of the claimed subject may be stored on or transmitted across some form of computer-readable media. Computer-readable media may be any available media that may be accessed by a computer. By way of example, computer-readable media may comprise, but is not limited to, "computer-readable storage media" and "communications media."

"Computer-readable storage media" include volatile and non-volatile, removable and non-removable media implemented in any method or technology for storage of information such as computer-readable instructions, computer-executable instructions, data structures, program modules, or other data. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer-readable instructions, computer-executable instructions, data structures, program modules, or other data in a modulated data signal, such as carrier wave or other transport mechanism. Communication media also includes any information delivery media.

As used in this application, the term "or" is intended to mean an inclusive "or" rather than an exclusive "or". That is, unless specified otherwise or clear from context, "X employs A or B" is intended to mean any of the natural inclusive permutations. That is, if X employs A, X employs B, or X employs both A and B, then "X employs A or B" is satisfied under any of the foregoing instances. In addition, the articles "a" and "an," as used in this application and the appended claims, should generally be construed to mean "one or more", unless specified otherwise or clear from context to be directed to a singular form.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

We claim:
1. A method comprising:
    obtaining a representation of a call for a data parallel (DP) function, wherein the representation includes indicators of arguments associated with the call for the DP function;
    generating an invocation stub, based at least in part upon the representation and the associated arguments, the invocation stub including computer executable instructions that bridge a logical arrangement of DP computations of the DP function to a physical arrangement of DP computations to be performed on DP hardware of one or more computing devices by calculating logic indices of each DP activity based on physical thread indices and a logical compute domain.
2. A method as recited in claim 1, wherein the generating comprises determining a physical location in the DP hard- ware where the DP computations will occur for the logical arrangement of the DP computations.

3. A method as recited in claim 1, wherein the generating comprises setting up a field for the DP function with target-dependent resources, wherein the field is a data set to be operated upon by the DP computations of the DP function.

4. A method as recited in claim 1, wherein the generating comprises setting up a field for the DP function with target-dependent resources, wherein the field comprises a data set to be operated upon by the DP computations of the DP function and wherein the setting up includes examining the arguments associated with the DP function and configuring the data set based upon the examining.

5. A method as recited in claim 1, wherein the generating comprises setting up a field for the DP function with target-dependent resources, wherein the field comprises a data set operated upon by the DP computations of the DP function and wherein the setting up includes declaring how many threads inside a thread group are to be deployed in multiple dimensions.

6. A method as recited in claim 1, wherein the generating comprises setting up a field for the DP function with target-dependent resources, wherein the field comprises a data set operated upon by the DP computations of the DP function and wherein the setting up includes mapping of a thread position of the DP hardware to a logical DP activity position in the logical arrangement of the DP computation.

7. A method as recited in claim 1, wherein the generating comprises setting up a field for the DP function with target-dependent resources, wherein the field comprises a data set operated upon by the DP computations of the DP function and wherein the setting up includes mapping of a thread position of the DP hardware to a logical DP activity position in the logical arrangement of the DP computation, the mapping including transformation index flattening and index raising.

8. A method as recited in claim 1, wherein the generating comprises preparing parameters of a kernel based upon what the kernel expects, the kernel being a unit DP computation of the DP function.

9. A method as recited in claim 1, wherein the generating comprises preparing parameters of a kernel based upon what the kernel expects, the kernel being a unit DP computation of the DP function, wherein the preparing includes:
determining whether the associated arguments include one or more special indices;
in response to the determining, creating index instances based upon a type of one or more special indices.

10. A method as recited in claim 1, wherein the generating comprises preparing parameters of a kernel based upon what the kernel expects, the kernel being a unit DP computation of the DP function, wherein the preparing includes:
determining whether the associated arguments match actual parameters of the kernel;
in response to the determining, broadcasting a value for the kernel to use.

11. A method as recited in claim 1, wherein the generating comprises preparing parameters of a kernel based upon what the kernel expects, the kernel being a unit DP computation of the DP function, wherein the preparing includes:
determining whether the associated arguments match actual parameters;
in response to the determining, projecting a field, wherein the field is a data set operated upon by the DP computations of the DP function.

12. A method as recited in claim 1, further comprising outputting the invocation stub into a memory.

13. A method as recited in claim 1, the DP hardware being capable of performing DP computations and the logical arrangement of the DP computations being defined, at least in part, by the representation of the call for the DP function with its associated arguments.

14. One or more computer-readable storage devices storing computer-executable instructions that, when executed, cause one or more computer to perform operations, the operations comprising:
obtaining a representation of a call for a DP function, wherein the representation includes indicators of arguments associated with the call for the DP function;
generating an invocation stub, based at least in part upon the representation and the associated arguments, the invocation stub including computer executable instructions that bridge a logical arrangement of DP computations of the DP function to a physical arrangement of DP computations to be performed on DP hardware of the one or more computing devices by calculating logic indices of each DP activity based on physical thread indices and a logical compute domain, the DP hardware being capable of performing DP computations and the logical arrangement of the DP computations being defined, at least in part, by the representation of the call for the DP function with its associated arguments,
the generating comprising:
determining a physical location in the DP hardware where the DP computations will occur for the logical arrangement of the DP computation;
choosing an appropriate thread deployment strategy;
setting up a field for the DP function with target-dependent resources, wherein the field comprises a data set operated upon by the DP computations of the DP function, the setting up including:
examining the arguments associated with the DP function and configuring the data set based upon the examining;
declaring how many threads inside a thread group are to be deployed in multiple dimensions;
preparing parameters of a kernel based upon what the kernel expects, the kernel being a unit DP computation of the DP function, the preparing including:
determining whether the associated arguments include one or more special indices;
in response to the determining regarding the one or more special indices, creating index instances based upon the one or more special index types;
determining whether the associated arguments match actual parameters;
in response to the determining regarding the associated arguments matching actual parameters, broadcasting a value for the kernel to use or projecting a field, wherein the field is a data set operated upon by the DP computations of the DP function.

15. A system comprising:
a data parallel (DP) compute engine comprising one or more graphics processing units; and
a non-DP host configured with instructions that are executable to perform acts comprising:
obtaining a representation of a call for a DP function, wherein the representation includes indicators of arguments associated with the call for the DP function;
generating an invocation stub, based at least in part upon the representation and the associated arguments, the invocation stub including computer executable instructions that bridge a logical arrangement of DP computations of the DP function to a physical arrangement of DP computations to be performed on DP hardware of the one or more computing devices, the DP hardware being capable of performing DP computations and the logical arrangement of the DP computations being defined by the representation of the call for a DP function with its associated arguments;

the generating comprising:

setting up a field for the DP function with target-dependent resources, wherein the field comprises a data set operated upon by the DP computations of the DP function;

preparing parameters of a kernel based upon what the kernel expects, the kernel being a unit DP computation of the DP function; and outputting the invocation stub into a memory.

16. The system as recited in claim 15, wherein the setting up includes:

examining the arguments associated with the call for the DP function and configuring the data set based upon the examining;

declaring how many threads inside a thread group are to be deployed in multiple dimensions; and mapping of a thread position of the DP hardware to a logical DP activity position in the logical arrangement of the DP computations.

17. The system as recited in claim 15, wherein the setting up includes mapping of a thread position of the DP hardware to a logical DP activity position in the logical arrangement of the DP computations, the mapping including transformation index flattening and index raising.

18. The system as recited in claim 15, wherein the preparing includes:

determining whether the associated arguments include one or more tokens;

in response to the determining regarding the one or more tokens, creating index instances based upon the one or more tokens.

19. The system as recited in claim 15, wherein the preparing includes:

determining whether the associated arguments match actual parameters;

in response to the determining regarding the associated arguments matching the actual parameters, broadcasting a value for the kernel to use or projecting a field, wherein the field comprises a data set operated upon by the DP computations of the DP function.

20. The system as recited in claim 15, wherein the preparing includes:

determining whether the associated arguments include one or more tokens;

in response to the determining regarding the one or more tokens, creating index instances based upon the one or more tokens;

determining whether the associated arguments match actual parameters;

in response to the determining regarding arguments matching the actual parameters, broadcasting a value for the kernel to use or projecting a field, wherein the field comprises a data set operated upon by the DP computations of the DP function.

\* \* \* \* \*